US011386622B1

(12) United States Patent
Obeyesekere et al.

(10) Patent No.: US 11,386,622 B1
(45) Date of Patent: Jul. 12, 2022

(54) PHYSICAL ITEMS AS BASIS FOR AUGMENTED REALITY APPLICATIONS

(71) Applicant: Amazon Technologies, Inc., Reno, NV (US)

(72) Inventors: Vasitha Obeyesekere, Seattle, WA (US); Kim Houchens, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 16/549,654

(22) Filed: Aug. 23, 2019

(51) Int. Cl.
| | |
|---|---|
| *G06T 19/00* | (2011.01) |
| *G06T 7/70* | (2017.01) |
| *G06T 7/13* | (2017.01) |
| *G06Q 30/06* | (2012.01) |
| *G06K 19/07* | (2006.01) |

(52) U.S. Cl.
CPC ........ *G06T 19/006* (2013.01); *G06K 19/0723* (2013.01); *G06Q 30/0631* (2013.01); *G06T 7/13* (2017.01); *G06T 7/70* (2017.01); *G06T 2200/24* (2013.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 2005/0089213 A1* | 4/2005 | Geng | ................ | G06K 9/00214 382/154 |
| 2013/0282715 A1* | 10/2013 | Xu | .......................... | G06F 16/40 707/736 |
| 2014/0108136 A1* | 4/2014 | Zhao | .................. | G06Q 10/0833 705/14.49 |
| 2015/0091780 A1* | 4/2015 | Lyren | ...................... | G06F 3/012 345/8 |
| 2015/0213238 A1 | 7/2015 | Farha | | |
| 2015/0262219 A1* | 9/2015 | Vock | .................. | G06Q 30/0242 705/14.41 |
| 2015/0294433 A1* | 10/2015 | Ye | ......................... | G06F 3/0484 345/418 |
| 2016/0125765 A1* | 5/2016 | Meretei | ................. | G06F 19/325 434/262 |

(Continued)

OTHER PUBLICATIONS

Kan, Tai-Wei, Chin-Hung Teng, and Wen-Shou Chou. "Applying QR code in augmented reality applications." Proceedings of the 8th International Conference on Virtual Reality Continuum and its Applications in Industry. 2009.*

(Continued)

*Primary Examiner* — Tapas Mazumder

(74) *Attorney, Agent, or Firm* — Hogan Lovells US LLP

(57) ABSTRACT

A tag positioned on an object provides information for selecting augmented reality (AR) content that is based, at least in part, on the object. The object may serve as a touchpoint for selecting and presenting AR content through a user device. The user device may scan the object to extract the tag, which may be used to select AR content based on the object itself, a user profile, or other information. The AR content may be transmitted to the device for presentation on a display screen. The user may interact with the AR content and receive additional information from the provider, such as recommendations or sharing options.

20 Claims, 22 Drawing Sheets

(56) References Cited

U.S. PATENT DOCUMENTS

| | | | |
|---|---|---|---|
| 2016/0189288 A1* | 6/2016 | Todeschini | G06Q 30/0643 |
| | | | 705/27.2 |
| 2017/0200193 A1 | 7/2017 | Bigley | |
| 2017/0270324 A1 | 9/2017 | Younger | |
| 2018/0197336 A1* | 7/2018 | Rochford | G06T 19/006 |
| 2019/0012756 A1* | 1/2019 | Han | G06T 19/20 |
| 2019/0019335 A1* | 1/2019 | Elangovan | G06T 19/006 |
| 2019/0303634 A1 | 10/2019 | Broselow | |
| 2019/0362554 A1* | 11/2019 | Chen | G06F 3/04815 |

OTHER PUBLICATIONS

Non-Final Office Action issued in U.S. Appl. No. 16/561,789 dated May 15, 2020.
Final Office Action issued in U.S. Appl. No. 16/561,789 dated Nov. 12, 2020.
Non-Final Office Action issued in U.S. Appl. No. 16/561,789 dated Mar. 18, 2021.
Notice of Allowance issued in U.S. Appl. No. 16/561,789 dated Aug. 9, 2021.

* cited by examiner

PHYSICAL ITEMS AS BASIS FOR AUGMENTED REALITY APPLICATIONS

BACKGROUND

The widespread adoption of portable computing devices, such as smartphones and tablet computers, has resulted in a corresponding increase in the amount and types of electronic content available to players. This includes the providing of augmented reality (AR) content, where a device can capture video content of a location and a computing device can render content such that it appears, at least as displayed on a screen of the device, that the content exists in that location. As the computing device moves, the view of the content can change accordingly, being rendered as if the content corresponds to an actual three-dimensional object being captured by the camera of the device at the appropriate location and angle. Integrating physical objects, that may otherwise be discarded or considered secondary to a user's experience, may be challenging.

BRIEF DESCRIPTION OF THE DRAWINGS

Various embodiments in accordance with the present disclosure will be described with reference to the drawings, in which.

DETAILED DESCRIPTION

Figure 1:
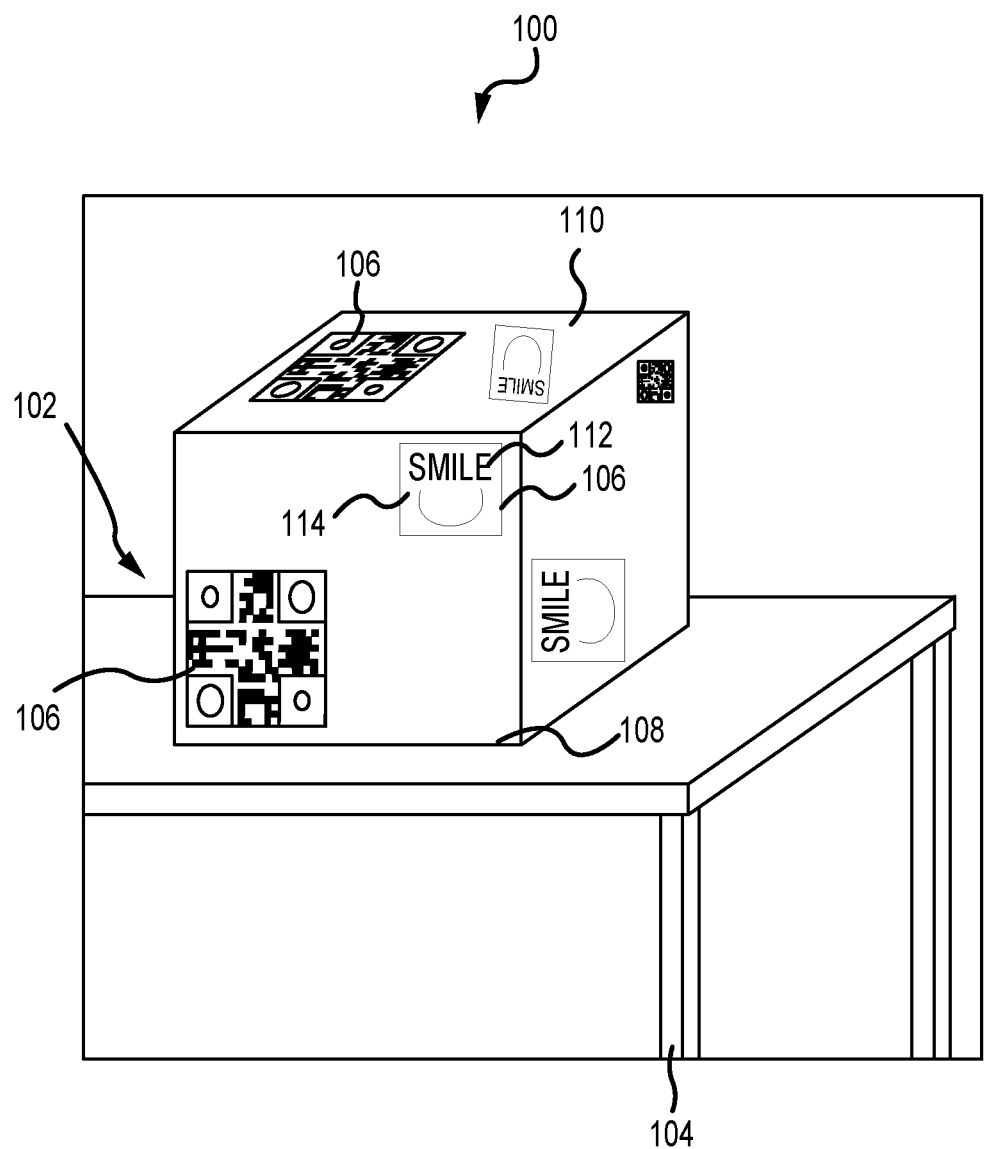
FIG. 1 illustrates an example approach to using physical objects in an augmented reality (AR) environment that can be analyzed in accordance with various embodiments.

Systems and methods in accordance with various embodiments of the present disclosure overcome one or more of the above-referenced and other deficiencies in conventional approaches to using physical objects (e.g., objects, items, packages) in an augmented-reality application. For example, users may order items from a seller, such as an online marketplace, and have those items delivered. Delivered items may be packaged in boxes, envelopes, bubble packaging, and the like. Moreover, packaging may be provided by the seller or from the original manufacturer. For example, the online marketplace may use boxes that include a unique visual marker, such as a logo, symbol, or the like, on the outside. Additionally, the item may be packaged within a box or other receptacle from the original manufacturer, which may include the original manufacturer's logo or information about the item. Typically, the packaging is discarded upon receipt (e.g., thrown away or recycled) or may be repurposed by the user. This behavior, however, is undesirable because it loses an opportunity to engage with the user, and possible bring the user back into the ecosystem of the online marketplace. Accordingly, systems and methods of the present embodiment may include augmented reality (AR) applications that may integrate into the packaging utilized to deliver items to users.

In various embodiments, the packaging used to deliver an item to the user may be utilized as a spatial icon (e.g., a physical object in space) that acts as a touchstone for generation of an AR application that may enable interaction with the user. That is, a location of the physical item may be determined, with respect to a user device, and subsequent AR content may be supplied based on that location. Interaction with the object may be through an electronic application (e.g., an app) that may be installed on a user device (e.g., smart phone, tablet, wearable device, etc.) and associated with the user, such as via a user account. Interaction with the augmented experience may also be through interface with the physical object, as will be described herein. Upon receipt of the item, the user may open the app and scan or otherwise interact with the box, which may include a code or tag that may be recognized by the app to launch the AR application and/or the AR content on the device. The AR application may provide interactive content, or the like, for the user. For example, the AR application may include games, virtual avatars, messages, and the like for increasing interaction with the user. As a result, the user may continue to engage with the ecosystem of an online marketplace provider (e.g., provider, seller). This ecosystem may include the application where the user purchased the items initially, other applications made available through the provider, partner applications, and the like. Additionally, the user may receive improved experiences from producers or providers of various products, such as links to product websites or the like. As a result, the provider of the AR application and ecosystem may partner with various other organizations or producers in order to enhance the customer experience, which may be hosted or provided either by the provider, by the producers, by a third party, or with some combination thereof.

In various embodiments, the packaging is scanned and the tag is recognized via the AR application to launch the AR content. In various embodiments, the tag may be utilized to determine a presentation mode for the AR content, which may be associated with how different types of content are presented. For example, the AR content may replace the object, integrate the object, integrate portions of the object, or the like. The packing may be used as a physical touchstone such that a rendering may be applied to the packaging, as viewed through the user device. That is, the packaging may be transformed into a different object, when viewed through the user device, to enable the user to interact with the packaging by using the AR application. Additionally, in various embodiments, the packaging may be used as a guidepost or touchstone for rendering additional content, which may interact with the packaging through the AR application, such as by rendering content that appears to be positioned on the object, when viewed through the user device. In this manner, the user may receive additional functionality and value from purchasing items associated with the provider because the user receives both the item purchased and an additional experience through the AR application. By providing the additional content, the user may be more satisfied with using products and services from the provider.

In various embodiments, use of the AR application and associated AR content may be tied to a user account associated with the provider. For example, the user account may include one or more profiles that may identify items purchased or viewed by the user when utilizing the online marketplace or other services from the provider. As a result, the AR content may be tailored or directed toward the items associated with the packaging. For example, if the user were to purchase a basketball that is shipped in a cardboard box, the AR application may be utilized to generate AR content such as a virtual basketball game. The provider may make the association between the user profile and the item within the packaging based, at least in part, on the tag and the associated user profile. For example, the provider may have information related to items purchased by the user. As a result, when the AR application receives the tag, it may be tied to the purchase to generate the AR content. Accordingly, the user has further interaction with the provider. This additional functionality may generate good will or feeling toward the provider and incentivize the user to continue using the provider's services.

In various embodiments, additional functionality may be incorporated into the AR application to associate with the user profile. For example, upon receiving permission from the user, the AR application may enable the user to share, for example through a social media platform, information about the AR application and/or the AR content. By way of example, the user may inform their followers on social media that they are using an AR application from the provider and post a screenshot of the AR content enabled through the AR application. Additionally, the AR application may be used to provide additional suggestions for other products or items to the user. Also, in embodiments, the AR application may be used to provide discounts or other rewards to the user. As a result, user engagement may be improved by incorporating information about the user into the experience.

As mentioned, an increasing number of applications are being developed that provide an AR experience, if not a full virtual reality (VR) experience. In a conventional augmented reality experience, a user is able to utilize a computing device (or computer-connected device) with a camera to capture and display a live view of an area around the user. An augmented reality application executing on the computing device can analyze at least a portion of the captured image data, as well as sensor data and the like, to determine information about the region around the user, such as the locations of various physical objects or surfaces. This information makes up the background of the "scene" in which augmented reality content is to be displayed. The AR application can utilize the scene information to locate surfaces and/or locations at which it is appropriate to place virtual objects of the AR application or to identify specific physical objects for interaction with the virtual objects. For example, the application might decide to place virtual animals or the like at various nearby locations, such that when the user views the live camera feed through a display of the AR device, the view will display a rendering of the animals over the live camera feed such that it appears as if the virtual animals are located in that scene. Additionally, in embodiments of the present disclosure, the physical objects or services may be isolated for direct incorporation into the AR experience, as described below. Furthermore, in various embodiments, portions of the physical objects may be removable or segmented from the physical objects to be incorporated into or to generate portions of the scene. As the user moves the AR device, the rendering of the animals or other content will adjust as well, such that it appears as if the animal or other content is actually physically located at a particular location in the scene near the user. Thus, if a user pans to the right then the animal or other content will appear to move to the left along with the other objects in the scene. In another example, if a portion of the object is removed, moving or otherwise adjusting that portion may also lead to adjustments in the content. By way of example only, if the portion of the object corresponds to a racket, the AR scene may include tennis balls coming toward the user, as the user moves the portion of the object, the racket may appear to move as well and interact with the AR generated tennis balls. In other embodiments, the virtual object may remain still and the user may obtain a view of the virtual object from a different perspective. Approaches for locating appropriate surfaces or locations for rendering AR content, as well as approaches for adjusting the rendered location based on movements of the device, are well known in the art and as such will not be discussed in detail herein.

FIG. 1 illustrates an environment 100 that may be utilized to start an AR experience by utilizing an object 102 (e.g., physical object), such as a box (e.g., packaging, cardboard box, storage box, etc.) to generate and render AR content via an AR application. The illustrated object 102 is positioned on a table 104 in the illustrated embodiment, but it should be appreciated that the object 102 may also be arranged on the floor or any other location. Additionally, the illustrated object 102 is shown as a closed box, it is should be appreciated that the box may also be fully open, partially open, or any status in between. Furthermore, while a box is shown in FIG. 1 it should be appreciated that the object 102 may also be a tube, an envelope, a bubble mailer, or any other transportation item that may be used for packaging or shipment. Additionally, the illustrated box includes six sides and is generally closed, but it should be appreciated that the object 102 may include openings or cut outs, such as a cut out that enables visual inspection into the box, a portion of the box that is removed, or the like.

The object 102 includes tags 106 (e.g., graphical tags, visual markers, etc.) positioned on a side 108 and a top 110 of the object 102. It should be appreciated that the location of the tag 106 is for illustrative purposes only, and that the tag 106 may be arranged at a variety of different locations. Additionally, there may only be a single tag 106 or there may be tags 106 on each face of the object 102. For example, as noted above, the box may be open such that the tag 106 on the top 110 would not be visible, and as a result, including additional tags 106 at other locations may provide an improved experience for the user because the packaging may be used in a variety of configurations. As used herein, the tag 106 refers to a high contrast element that may be scanned by an electronic device to initiate an AR application and/or AR content. In various embodiments, as will be described below, the tags 106 may be tied to or correlated to specific AR content. One example of a tag 106 is a QR code. However, it should be appreciated that the tag 106 is not limited to a QR code, a barcode, or the like. For example, the tag 106 may be integrated into the packaging or a label and may include high contrast areas, such as a dark area 112 next to a light area 114, arranged in a particular configuration. By way of example only, the tag 106 on the side 108 may include a logo, such as "Smile" with a curved mouth underneath it. In other words, the arrangement of the high contrast areas (e.g. lighter areas by darker areas) may be considered the tag 106. In various embodiments, the tag 106 includes geometric shapes or unique shapes that may be used to trigger the AR application and/or the AR content via the AR application. It should be appreciated that the tag 106 may be designed for recognition from a distance greater than recognition for traditional QR codes or barcodes. For example, the tag 106 may be recognized from several feet away while the physical object is displayed within the field of view of a user device. Furthermore, the illustrated embodiment includes the tags 106 on each visible side. In various embodiments, each portion of the object 102 may include the tag(s) 106, and as a result, the position in which the user arranges the object 102 on the table 104 will not impact the experience. Furthermore, in various embodiments, the orientation of the tag 106 may be captured and registered by the device regardless of orientation. For example, in the illustrated embodiment, the tag 106 on the top 110 is upside down such that the "Smile" logo is written substantially in reverse and upside down. However, in various embodiments, metadata and the like associated with the tag 106 may still be registered, providing additional operations for the provider.

Figure 2:
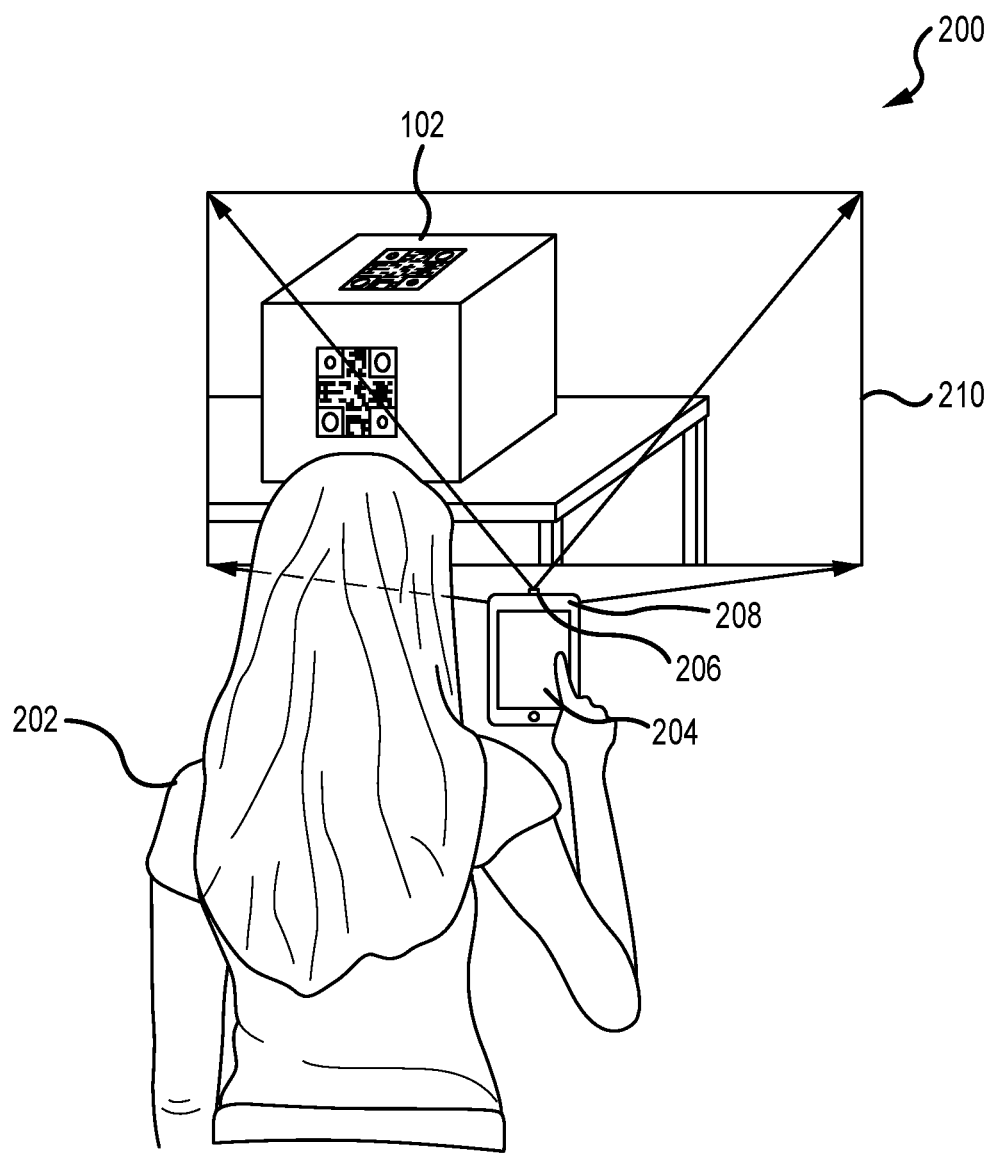
FIG. 2 illustrates an example approach to obtaining a field of view from a camera including a physical object for an AR environment in accordance with various embodiments.

FIG. 2 illustrates an example situation 200 wherein a user 202 is utilizing a portable computing device 204, such as a smartphone, to consume augmented reality content generated with respect to a physical scene, including objects visible from a location of the user and/or a camera of the device. As mentioned, although a portable computing device is illustrated this is only one of a number of different types of devices that can be used to provide augmented reality content within the scope of the various embodiments. The computing device 204 in this example includes a camera 206 and an IR transceiver 208 on a back face of the device, opposite a display screen on which the AR content will be rendered with respect to a live view of a portion 210 of the scene contained within a field of view of the camera of the device.

In the illustrated embodiment, the camera 206 captures image information, such as a digital image or frame of video. Additionally, image information may also be captured via the IR transceiver 208. The overlapping fields of view, along with calibration information for the relative locations of the camera and IR transceiver on the device, can be used to correlate the regions of infrared data with the objects in the scene. This can enable the device (or a system in communication with the device) to determine the reflectivity, or at least a relative reflectivity, of the various objects in the scene. It should be mentioned that the infrared image can be significantly smaller than the live image, being grayscale in at least some embodiments and potentially being lower resolution than the full image or compressed with respect to the full image, among other such options. In the illustrated example, the object 102 is positioned within the portion 210 of the scene and may be utilized to generate AR content, which will be displayed on the computing device 204.

There can be various situations wherein it may be desirable to render or provide augmented reality AR content to viewers through a number of different devices. For example, multiple players might be playing a multiplayer game wherein AR content is displayed to each of the players through a respective computing device. As known for AR content, the view and content displayed on each device can be a function of the location of the device in at least some embodiments, as well as the orientation (or changes in orientation) of the respective device. This enables each device to function as an augmented window on the world, where the augmented content will appear to exist in the real world when viewed through the display of the device, typically laid over a live camera view. The scale, angle, and location of the augmented content can move as appropriate with the change in location and/or orientation of the computing device.

Devices used to access AR content can include any devices capable of rendering and/or displaying AR content, such as may include smart phones, tablet computers, smart glasses or contacts, VR headsets, and the like. In some embodiments the AR content will be rendered over a live camera view captured by the device and displayed on a display screen, such as on a smart phone, but in other embodiments the content may be displayed over an actual view, such as for smart glasses. In various embodiments the devices will have at least some type of position and/or orientation determination mechanism, such as a global positioning system (GPS) sensor or electronic gyroscope, which can enable the view to be determined in such a way as to render the AR content with an appropriate angle, scale, and rotation, etc. Each device can have a respective field of view that corresponds to a specific portion of the scene. For each device, only AR content corresponding to locations within that field of view will be rendered and displayed, at any given time, by a display of that device. In order to determine the angle and scale, as well as the point of reference for the field of view, the location of the device can also be determined. As mentioned, this can be determined using a GPS-based approach, or can use an iBeacon or triangulation-based approach, among others known or used for device location determination. The location information can help to determine the location of each device in the scene.

In order to make the AR content appear to be as realistic as possible, it can be desirable in many situations to further cause the rendered objects to appear to be positioned on, or with respect to, actual surfaces in the scene. This can include, for example, being positioned on a track, field surface, tabletop, or other object or element (physical or virtual) in the gameplay field. Further, it can be desirable that these objects are all of the appropriate scale and location with respect to each other, and that these relationships remain consistent unless intentionally varied within the game or content presentation. In order to provide such functionality, it can be desirable to map, model, or otherwise generate an accurate representation of the gameplay field, so that the content can be rendered appropriately with respect to that representation. While in some instances the field may be a fixed and well-known set of objects that does not change, in other instances the field may not be well known or may be able to vary throughout the game. In such situations, some amount of scene mapping using the relevant devices may be required.

For various AR applications, it can be desirable to locate various surfaces, contours, or objects that can be used as reference points for rendering AR content. For example, various embodiments can attempt to locate surfaces, particularly relatively smooth and horizontal surfaces, that can serve as positioning locations for AR content. As an example, data points determined from the captured image data can be analyzed to determine that there is a horizontal surface represented in the data. In response to detecting such a surface, and in some embodiments ensuring that various criteria are satisfied as may relate to size, angle, or smoothness, etc., a polygon or other geometric shape or construct can be generated. Information (e.g., coordinates) for this geometric construct can be determined on the device, or sent to the device, and used for placing rendered AR content. Sending geometric construct data can require much less bandwidth and memory than a full point cloud for a region, although in some embodiments point clouds can be used as well, or in place of the constructs. The constructs can have position and anchor points, for example, which can be used to define the location and shape of the construct. This relatively lightweight construct, definable using a relatively small set of points, allows for rapid adjustment in relative positioning based upon movement of a respective viewing device. This construct can be used as a reference for rendering AR content. Based at least in part upon the position of the geometric construct, which would typically not actually be displayed on the screen but maintained as data in memory, can be used as a reference to render a character or other AR object or element as an overlay with respect to the live view. As the device displayed the content changes position or orientation, the respective position of the geometric construct will change as well. This change can trigger a corresponding change in the rendering of the AR element, to maintain a consistent scale, position, and angle with respect to the geometric construct.

As mentioned, the location for each device can be determined using an appropriate technology or mechanism, such as GPS, iBeacon, or signal triangulation, among other such options. Movement of the device or changes in orientation can be determined using any of a number of sensors or components of the devices themselves, such as may include an electronic compass, magnetometer, accelerometer, electronic gyroscope, altimeter, and the like. The object and position information can be determined from captured sensor data, where the sensors can include various camera sensors (IR, ambient, stereoscopic), structure light components, ultrasonic sensors, or LIDAR sensors, among others.

While many examples presented herein relate to gaming applications, various other AR applications can take advantage of improved accuracy in positioning of virtual objects and other such actions in a virtual environment as well. For example, in a sporting event such an approach can be used to render information on a track or playing surface. In a store, such information can be used to render pricing or product information, views of persons or characters wearing or using various products, etc. For tourism, such an approach can be used to render information or characters in various locations, in order to provide information about the location or site. Various other approaches can be used as well, in situations where it is desired to render at least some amount of AR content, but the size of the space is too large for any single device to accurately map or determine the position and other distant information. Additionally, the various AR applications may be tied to the day-to-day interactions of users. For example, the AR application may generate information associated with other features associated with the provider, such as item pick up locations, partner brick and mortar stores, and the like. By way of example, a tag may be provided when a customer enters an associated brick and mortar store, the user may scan the tag, and then AR content for that store may be presented, such as a mapping illustrating special promotions or displays, guidance to items associated with a shopping list of the user, or the like.

Figure 3:
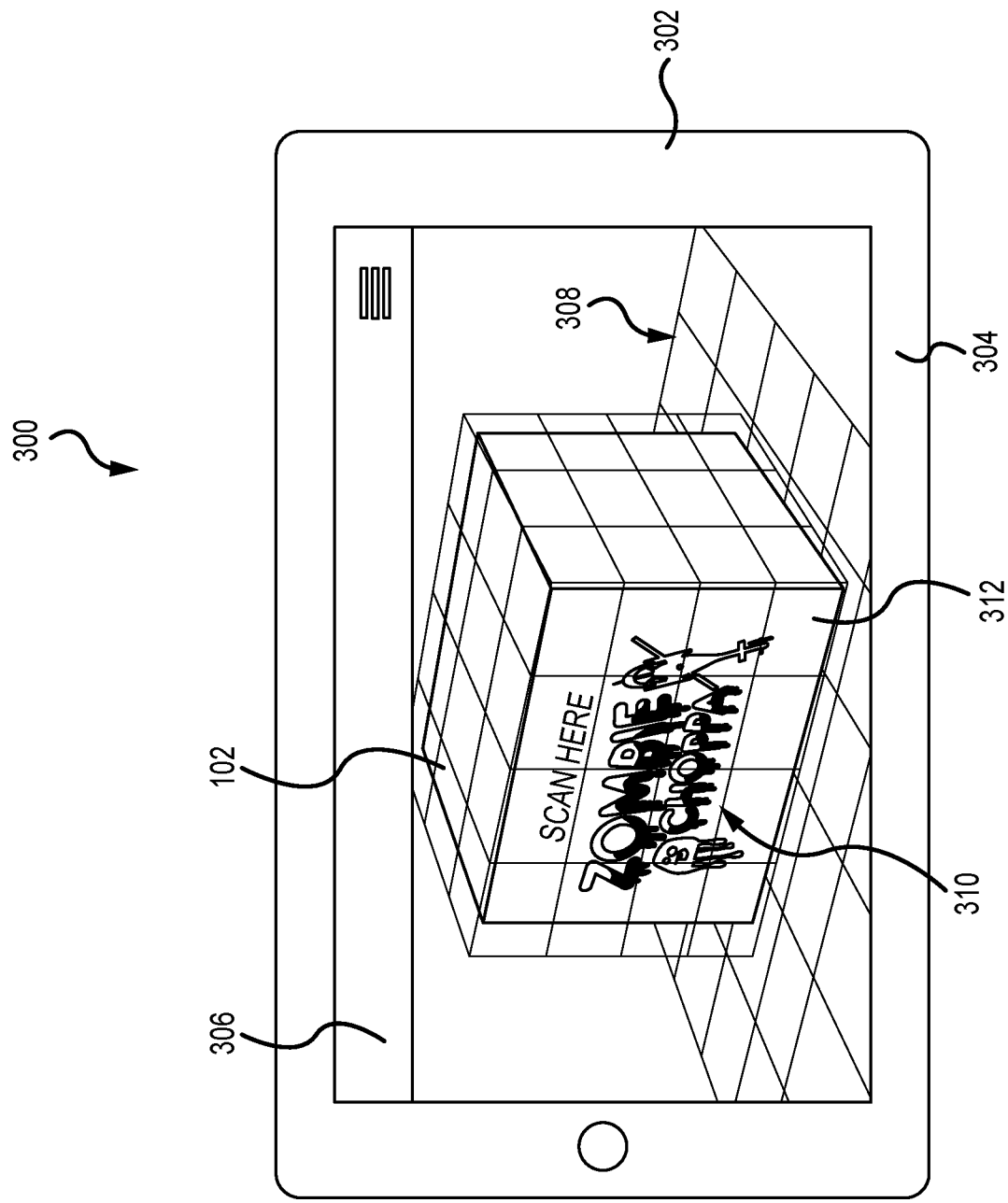
FIG. 3 illustrates an example situation including a field of view of an object including a tag for use in an AR environment in accordance with various embodiments.

FIG. 3 illustrates an example situation 300 of the object 102 as viewed on a display 302 of a computing device 304. In the illustrated embodiment, an AR application 306 executes to scan the object 102. The object 102 in the illustrated embodiment is a box, similar to the box illustrated in FIG. 1. A mapping 308 is generated over the object 102, which will enable the computing device 304 to orient the rendered AR content with respect to the object 102. In other words, the object 102 is used as a physical touchstone, in the real world, which may enable the user to center or reorient themselves if the object 102 falls outside of the field of view while using the application. Accordingly, the user's experience in using the application may be improved because the user can reorient themselves to the physical item located in front of them. Additionally, in various embodiments, the user can reorient the physical object to interact with the experience, such as by moving a cut our portion into the field or view.

As will be described below, the mapping 308 may represent barriers or boundaries for generation of the AR content. However, in other embodiments, the mapping 308 may designate areas to arrange AR content, such as generation of content that sits on the object 102. In various embodiments, the mapping 308 may be utilized to generate an initialization point, such as an area in space represented by an x-y-z coordinate. This coordinate may then be coupled with features and/or sensors of the computing device 304. For example, the computing device 304 may include a gyroscope that registers movement or tilt of the computing device 304, which may be used to adjust the display of the AR content via the AR application 306. In embodiments, the initialization point may be registered or stored during a particular period of time, such as while the AR application 306 is in use, even if the object 102 is removed after the initialization point is registered. In other words, the mapping 308, once generated, may continue to be used for a period of time, such as while the AR application 306 is operational for a particular session. As will be described below, the mapping 308 may be based, at least in part, on information, such as metadata, obtain from scanning a tag arranged on the object 102.

In the illustrated embodiment, the object 102 includes a tag 310, which corresponds to a high contrast area along a side 312 of the object 102. While the tag 310 is arranged on the side 312 in the illustrated embodiment, it should be appreciated that the tag 310 may be included at other locations and there may be multiple tags 310. The user may load the AR application 306 on the computing device and the AR application 306 may scan the object 102 to determine whether the tag 310 is present. For example, the AR application 306 may acquire the object 102 within a field of view and analyze sections of the image to determine whether the tag 310 is present. Upon recognizing the tag 310, the AR application 306 may initialize the mapping 308, which enables further use of the AR application 306, such as via generated AR content. As shown, the tag 310 enables recognition from a distance great enough that the object 102 is within the field of view, which offers an improvement over other tags, such as small QR codes, which may be functional when the QR code occupies substantially all of the field of view of the computing device. In various embodiments, if the physical object 102 never moves, the gyroscopes and accelerometers of the user device can insert the AR in digital space and move it as the user moves. However, if the physical object is moving, in various embodiments substantially constantly visible tags may be utilized. Furthermore, enabling greater amounts of the object within the field of view, while still enabling identification of the tag, may provide greater opportunity for AR content generation by using the object 102. In other words, the generated content may not be bound by the physical constraints of the object 102, in various embodiments.

In various embodiments, the tag 310 may include metadata or the like to enable a marker or fiducial-less approach to scaling and presentation of AR content. For example, different packaging options may include unique or associated metadata related to the dimensions of the object. For example, if the object is a box having dimensions of 1 foot×1 foot×1 foot, information stored within the tag associated with that object may be provided to the device, which facilitates rendering of the mapping 308 and/or additional content. In various embodiments, a data store or the like may store different dimensional information for various different objects, which may be accessible through information objected after scanning and recognizing the tags. As a result, while the illustrated embodiment may include the tag on one face or side of the object, information regarding the three-dimensional sizing of the object may be provided to generate a scaled rendering for presentation of subsequent AR content. Furthermore, in various embodiments, other techniques may be implemented in order to obtain information regarding the dimensions of the objects.

Figure 4:
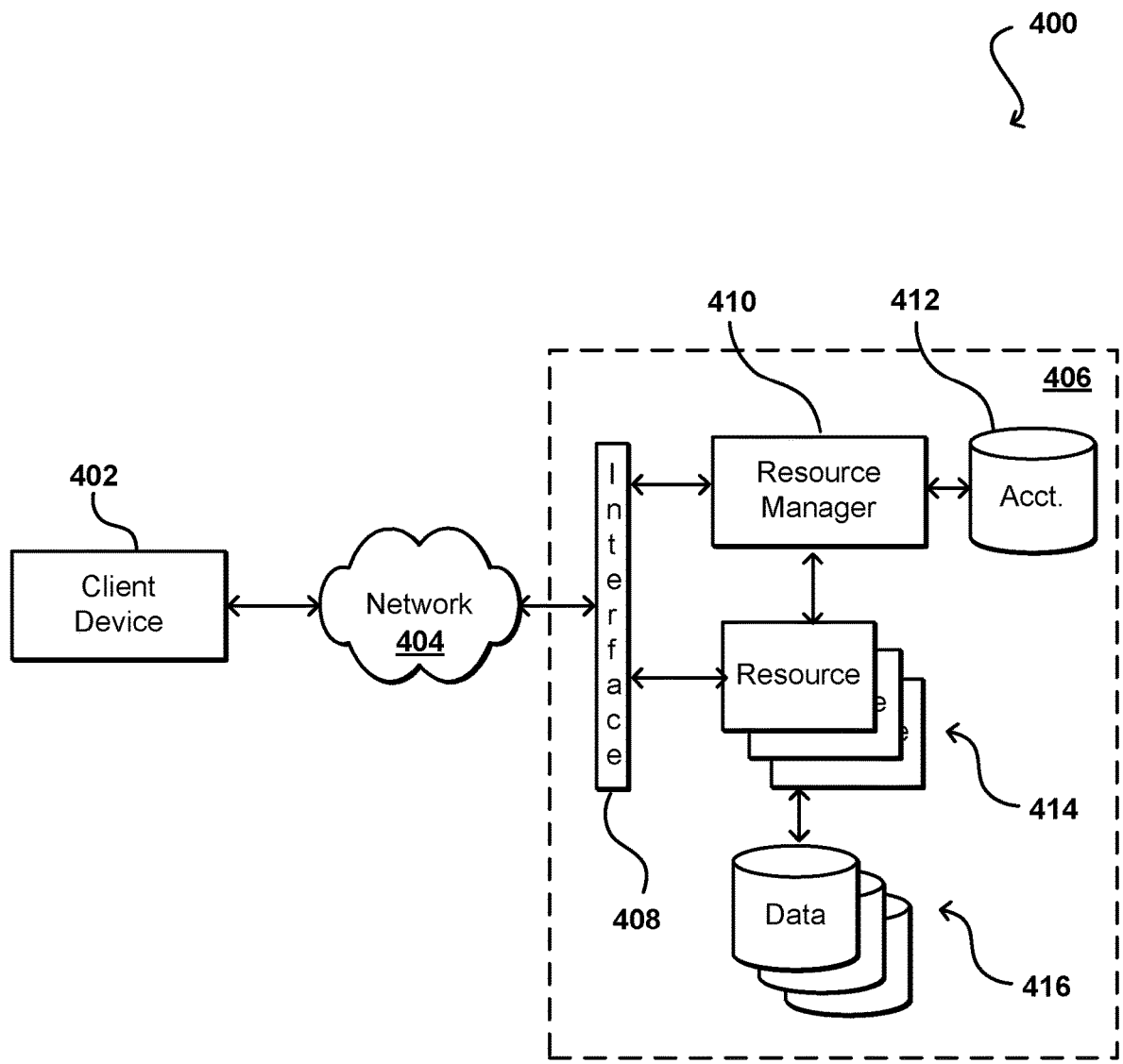
FIG. 4 illustrates an example environment in which various embodiments can be implemented.

As described above, in various embodiments, a provider, such as a provider of an online marketplace or a provider of one or more items for purchase, may generate the AR content for the benefit of the user. Also, in embodiments, third parties, on behalf of the provider, may generate and host the content. Additionally, in embodiments, the user may, at least in part, generate at least a portion of the content. FIG. 4 illustrates an example environment 400 in which aspects of the various embodiments can be implemented. In this example, a user is able to utilize a client device 402 to submit requests across at least one network 404 to a multi-tenant resource provider environment 406. The client device can include any appropriate electronic device operable to send and receive requests, messages, or other such information over an appropriate network and convey information back to a user of the device. Examples of such client devices include personal computers, tablet computers, smart phones, notebook computers, wearable devices, and the like. The at least one network 404 can include any appropriate network, including an intranet, the Internet, a cellular network, a local area network (LAN), or any other such network or combination, and communication over the network can be enabled via wired and/or wireless connections. The resource provider environment 406 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 414 of one or more types. These types can include, for example, application servers operable to process instructions provided by a user or database servers operable to process data stored in one or more data stores 416 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 414 can submit a request that is received to an interface layer 408 of the provider environment 406. The interface layer can include application programming interfaces (APIs) or other exposed interfaces enabling a user to submit requests to the provider environment. The interface layer 408 in this example can also include other components as well, such as at least one Web server, routing components, load balancers, and the like. When a request to provision a resource is received to the interface layer 408, information for the request can be directed to a resource manager 410 or other such system, service, or component configured to manage user accounts and information, resource provisioning and usage, and other such aspects. A resource manager 410 receiving the request can perform tasks such as to authenticate an identity of the user submitting the request, as well as to determine whether that user has an existing account with the resource provider, where the account data may be stored in at least one data store 412 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 402 to communicate with an allocated resource without having to communicate with the resource manager 410, at least until such time as a relevant aspect of the user account changes, the user is no longer granted access to the resource, or another such aspect changes.

The resource manager 410 (or another such system or service) in this example can also function as a virtual layer of hardware and software components that handles control functions in addition to management actions, as may include provisioning, scaling, replication, etc. The resource manager can utilize dedicated APIs in the interface layer 408, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 408 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 5:
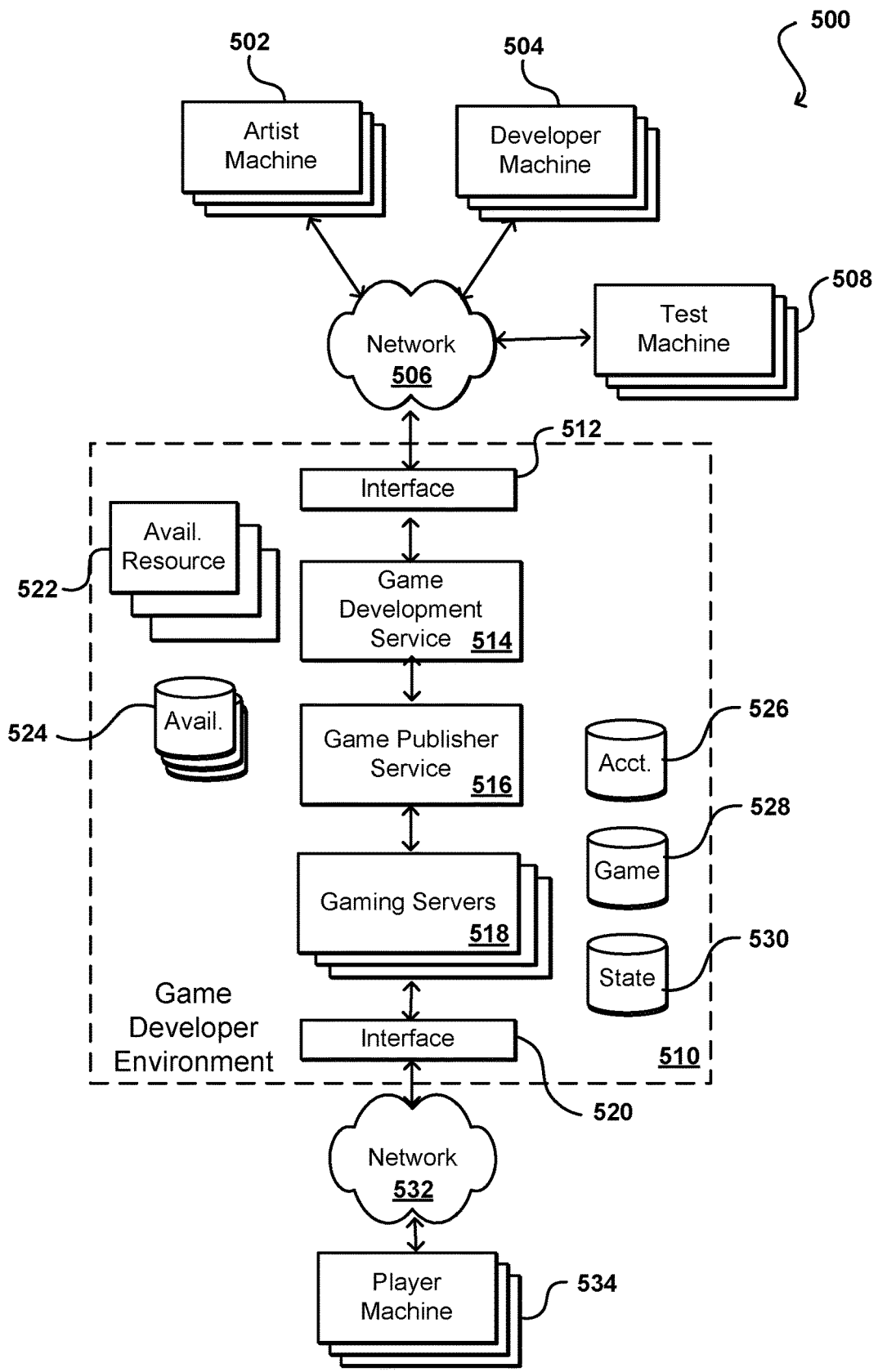
FIG. 5 illustrates an example gaming pipeline that can be used in accordance with various embodiments.

In various embodiments, gaming or other content may be provided to users. As a result, a provider may wish to provide resources to support such gaming platforms and services, which may encourage developers to generate content and/or simplify content generation for the provider. As illustrated in the example system 500 of FIG. 5, at least some of the resources can be used to support platforms and services useful in the development and providing of electronic gaming and three-dimensional graphical content, among other such options. For example, the artist machines 502 and developer machines 504 can collaborate via a game development service 514, which can be provided by a set of resources in a game developer environment 510, or other such resource environment, that are able to scale dynamically as discussed above. It should be understood that artists can fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. Machines such as the developer machines 504 and artist machines 502, as well as the player devices 534 in some embodiments, can utilize image information to generate and provide content, such as AR content, to a user device while operating within a provider AR environment. It should be appreciated that the AR content may be provided to multiple user devices, such as instances with multiplayer user experiences. In other words, multiple devices may share the same or substantially the same AR experience.

The development service can also provide communication services such as messaging and content sharing, among other such options. The game development service can store information for a game to at least one game repository 528, where the repositories can include graphics files, code, audio files, and the like. The game development service 514 can also work with an account manager, or at least maintain information in an account data store 526, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 516. The game publisher service 516 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 504 or otherwise. In some embodiments the game content might be published and made available to one or more test machines 508, which may be associated with the customer, such that the customer can test various builds or versions of the game. In some embodiments feedback provided by the test machines 508 may be provided to the game development service 514, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 518 which can run the game and enable player machines 534 to access the game content over one or more networks 532, which may be different from the network(s) 506 used for game development. This can include, for example, dedicated gaming networks, the Internet, cellular networks, and the like. The player machines 534 can communicate with the appropriate interfaces of an interface layer 520 to obtain the gaming content. In some embodiments the player machines 532 will download the gaming content for execution on the individual machines, and will upload (or otherwise communicate) gaming data, messages, and other information to the gaming servers 518, as well as to other players, social networking sites, or other such recipients. The gaming servers 518 can cause state information for the various instances of the game to be stored to at least one game state repository. This can hold state for the game as a whole or for individual game sessions, among other such options. As mentioned, in some embodiments the devices can send position or image data to a dedicated gaming server 518 or other component in the game developer environment 510, which can be aggregated and analyzed by a surface mapping component, or other such system or process, which can determine authoritative data for use in rendering augmented reality content. The authoritative data can include, for example, point cloud data, geometric primitives, location modeling, and the like. At least some of this data can be provided to the various player devices 534 in order for those devices to render the appropriate AR content for the location and orientation of a given device. In some embodiments the game content can be executed by the game servers and streamed in near real time to the player machines 534. In some embodiments there may alternatively be a mix of gaming content executed on the player machines and the gaming servers. Peer to peer connections among the player machines and other communications can be utilized as well in various embodiments.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

Figure 6:
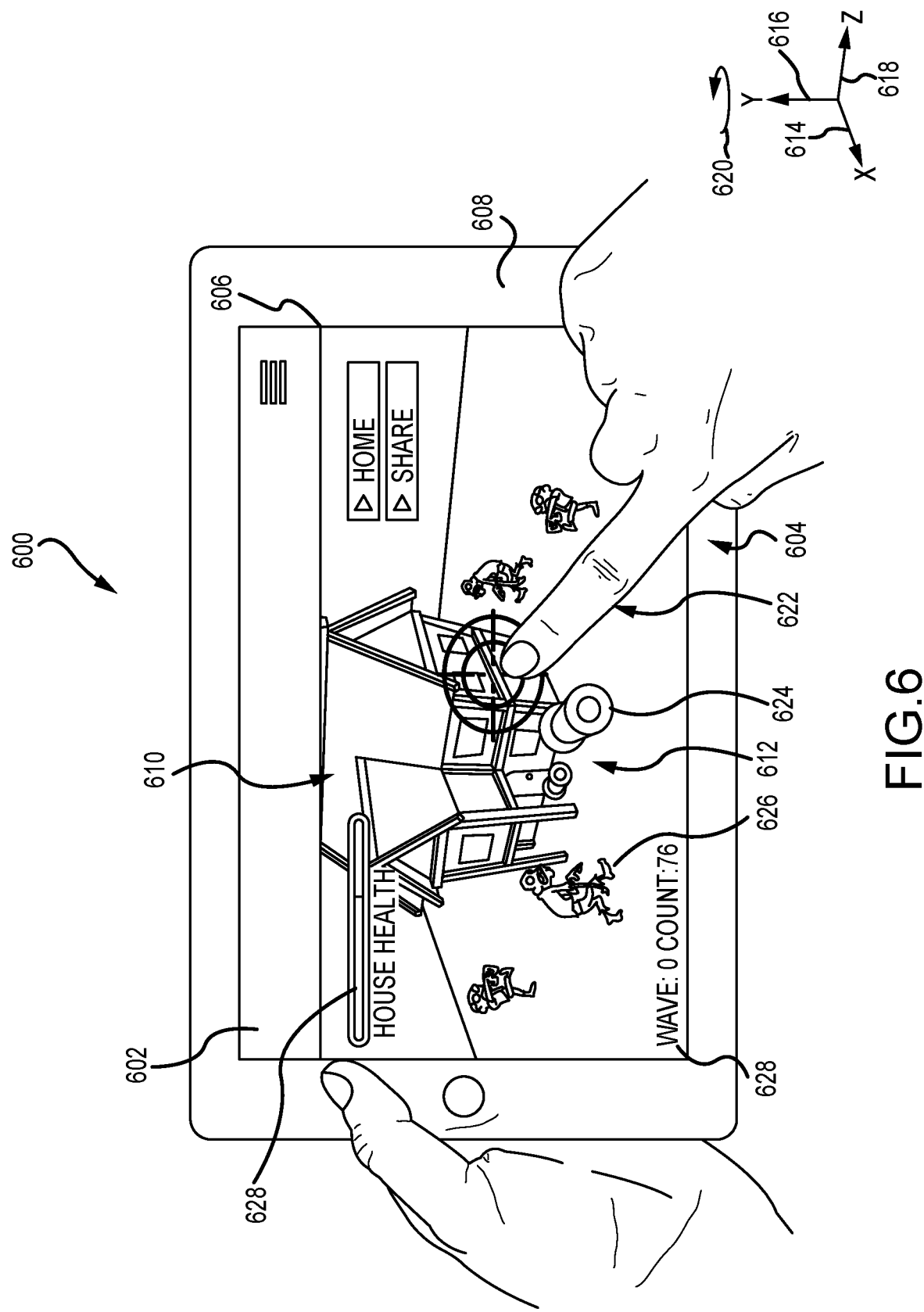
FIG. 6 illustrates an example situation of AR content presented in an AR environment in accordance with various embodiments.

FIG. 6 is an example situation 600 where an AR application 602 loads AR content 604 on a display 606 of a computing device 608. In various embodiments, the AR content 604 is generated in response to detection of a tag (such as the tag 310 of FIG. 3) and appropriate permissions and the like, as will be described below. The illustrated AR content 604 includes a house 610 positioned at an initialization point 612, which may be associated with an object scanned by the computing device 608. For example, the initialization point 612 may be at least based on a mapping, such as the mapping 308 described with respect to FIG. 3. The initialization point 612 acts as a reference for movement of the computing device, for example, as the user moves along an x-axis 614, y-axis 616, z-axis 618, circumferentially about the y-axis 620, or any other reasonable direction. While interacting with the AR content 604, the view on the display 606 may adjust, based on the movement of the computing device 608, to provide new or updated AR content 604. For example, if a field of view of the computing device 608 is moved such that the initialization point 612 has shifted, the view on the display 606 may be updated in response to the shift.

The illustrated AR content 604 is interactive, in that the user may provide an input 622, for example a touch input. The touch input in the illustrated embodiment interacts with a first AR content element 624, represented as a projectile, which is directed toward a second AR content element 626, represented as a monster or creature attacking the house 610. The illustrated AR content 604 may be representative of a defense game where the user attempts to stop the second AR content elements 626 from attacking the house 610. The first AR content element 624 may respond to the input 622 to direct the projectiles toward the second AR content elements 626. The AR content may further include game status information 628, such as number of enemies stopped, progress on a level, health of the house 610, or the like. In various embodiments, the user may rotate about the y-axis 616 to obtain views of different sides of the house 610, which may include second AR content elements 626 that are not visible from the present viewpoint. As described above, in the event the user moves the computing device 608 in a manner that the house 610 is no longer visible, the user can reorient themselves with the object 102, thereby providing a touchstone to return to the action for the user and the AR renderings. It should be appreciated that the example is for illustrative purposes only, and other types of games or experiences may be provided. For example, the second AR content elements 626 may also or in the alternative direct projectiles toward the user (in the AR environment) and the user may move the device to dodge the projectiles. Accordingly, various other types of interactions may be included where the user provides some input in response to the AR experience, such as moving the device, touching portions of the device, speaking a sound, or the like.

In various embodiments, the AR content 604 illustrated on the computing device 608 may be tied to the item or items obtained by the user and arranged within the object 102. For example, if the user had purchased a toy projectile launcher, the illustrated AR content 604 may be provided. As noted above, if the user had purchased a basketball, a virtual basketball game where the user interacts with a basketball to direct it toward a basket may be illustrated as the AR content 604. In embodiments, the user has signed into the AR application 602, for example via an account with the provider. The user may provide permission to utilize information from the account to generate or impact the AR content 604. For example, prior purchases by the user may be used to determine which AR content 604, from a group of content, is provided. Moreover, in various embodiments, particular products or items obtained may be tied to specific promotional consideration. For example, the manufacturer of the item may have a particular game or content, developed by or on behalf of the manufacturer. This link may be obtained by evaluating the user account information and the tag that triggers or guides later generation of the AR content 604.

Figure 7:
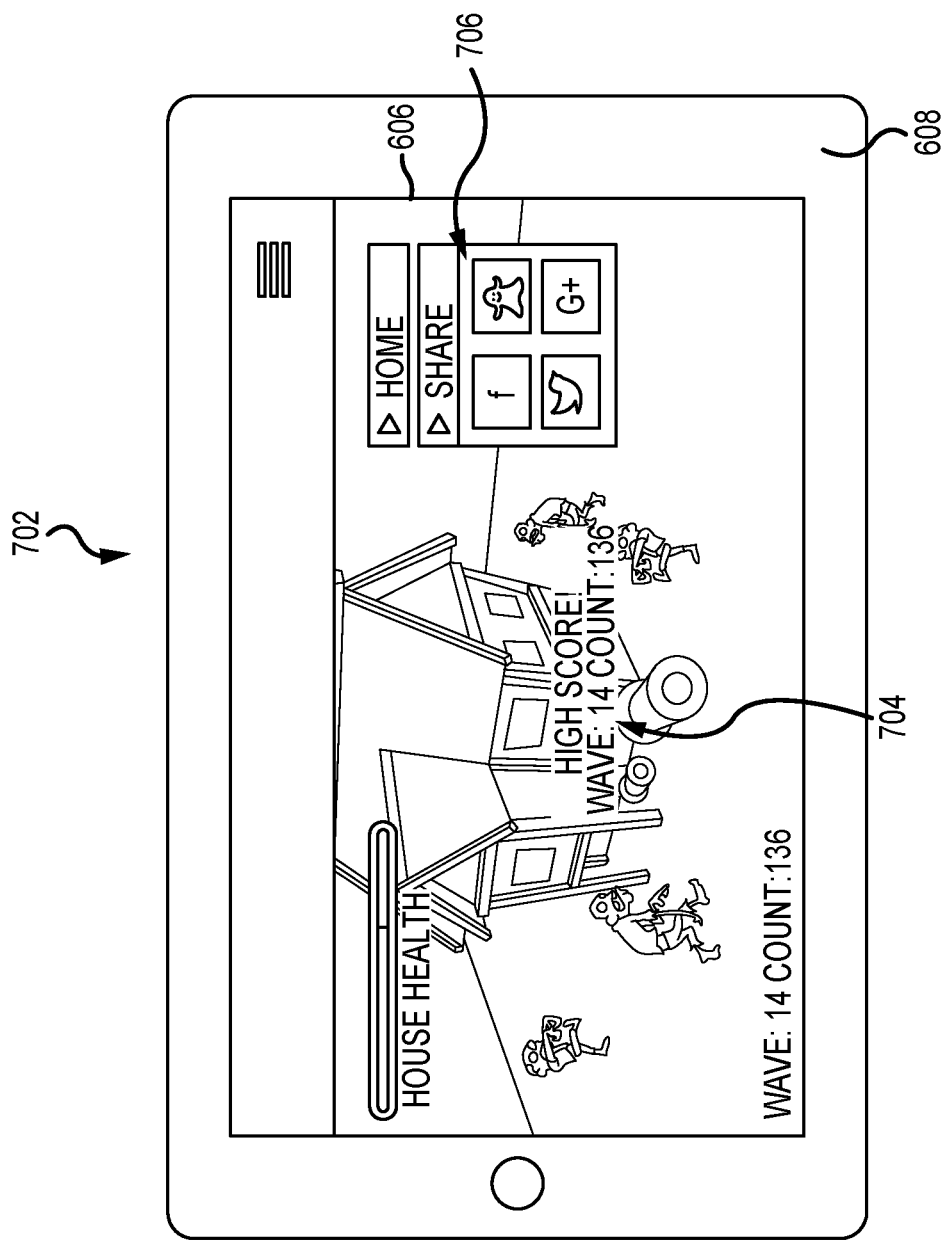
FIG. 7 illustrates an example situation of AR content presented in an AR environment in accordance with various embodiments.

FIG. 7 illustrates a situation 700 following completion of the AR content 604 associated with FIG. 6. Completion may include successfully completing level objectives, the user electing to quit playing, the user failing to complete level objectives, and the like. The illustrated result screen 702 includes information for the user, such as a score indicator 704 and a sharing option 706 such that the user may elect to broadcast their scores or the game along various social media platforms, with permission from the user to access their associated accounts. In various options, there may also be an option to restart the game to continue playing. In certain embodiments, the result screen 702 is overlaid over a game screen such that rendered content is still visible on the display. That is, the result screen 702 may include overlaid textual elements and the like.

In certain embodiments, the provider may institute one or more incentive systems into the environment in order to encourage repeated plays of the game. For example, a reward system may be integrated where achieving a threshold score provides a coupon or discount to the user on a later purchase. Additionally, collectable trophies or the like may be incorporated into the gameplay environment. As a result, the user may receive an incentive to play and utilize the AR content, and be rewarded for their time. This engagement may also lead the user back into the provider environment because with the coupon or the like, the user will be more likely to purchase subsequent items from the provider. Moreover, additional engagement for the provider may be obtained from the user's posts to social media accounts, where others may learn about the enhanced offerings from the provider. In embodiments, the AR content may be single use or time limited in use. Accordingly, the user may be encouraged to play for a specific period of time. In other embodiments, the content may be downloaded to the user device such that the user can return repeatedly to the content.

Figure 8:
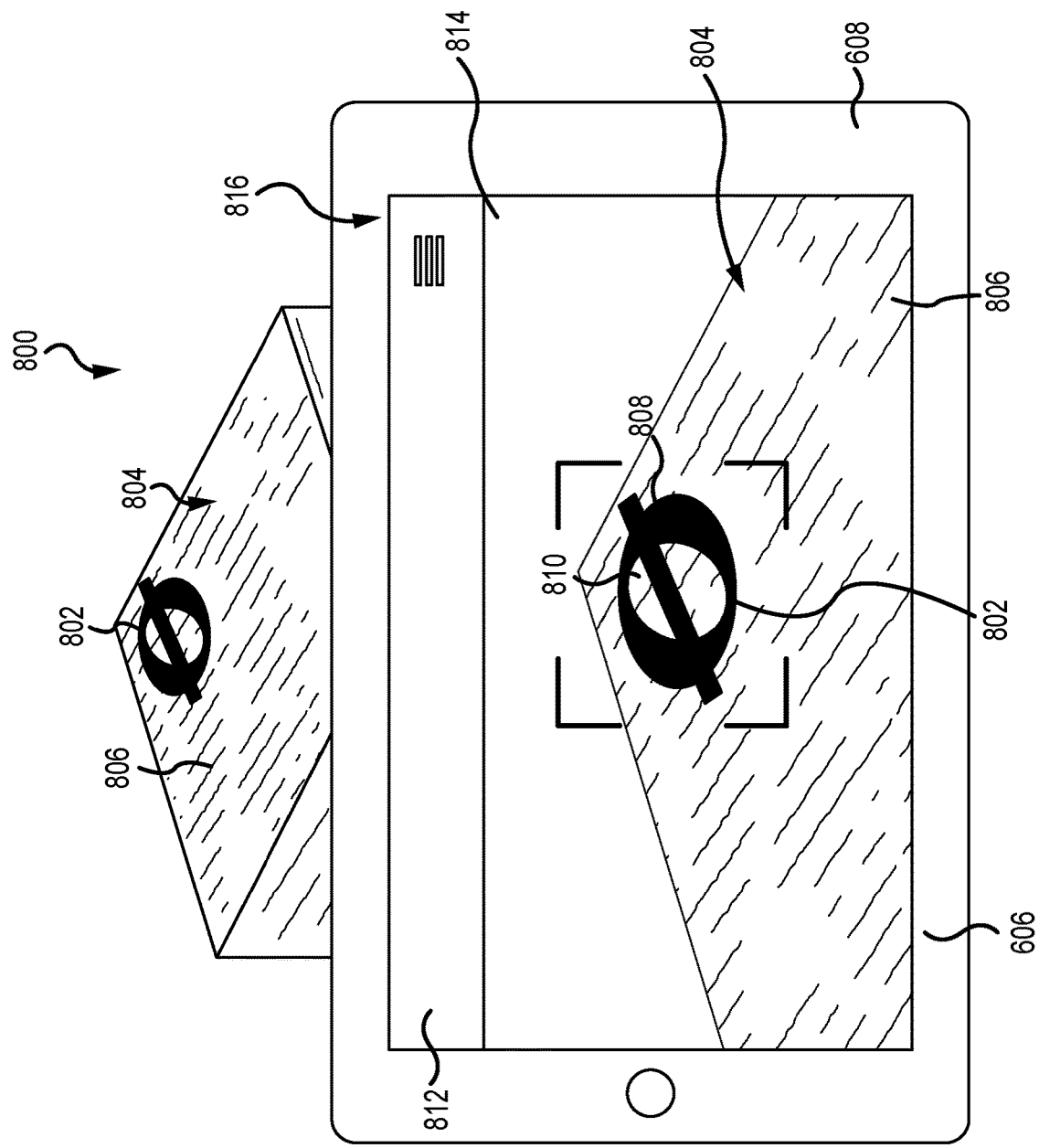
FIG. 8 illustrates an example situation including a field of view of an object including a tag for use in an AR environment in accordance with various embodiments.

FIG. 8 illustrates a situation 800 including a tag 802, which is illustrated as a graphical tag, arranged on an object 804. In the illustrated embodiment, the object 804 is a physical object, such as a box, and includes the tag 802 on a top portion 806 of the object 804. As described above, in various embodiments, the tag 802 includes a high contrast image, which may include text or symbols, that includes dark regions 808 arranged near light regions 810. This information may be scanned by an AR application 812 executing on a computing device 814 and, upon recognizing the tag 802 and associating the tag 802 with stored content, may launch AR content. The AR content may be tied to the tag 802 and/or a user profile. For example, certain tags 802 may be unique to particular products, such as a logo for a particular company that may generate AR content associated with products produced by that company. In other embodiments, the tag 802 may be tied to certain events, such as seasonal events, or may be tied to one or more items purchased by the user or that user information indicates would be enjoyed by the user.

In the illustrated embodiment, the image 816 on the display 606 of the computing device 608 does not include the entire object 804, but rather, is particularly focused on the tag 802 and the region around the tag 802. As noted above, in various embodiments, the tag 802 may include high contrast to facilitate detection and utilizing from a distance. However, it should be appreciated that the user may zoom in or otherwise focus the field of view from the computing device 608 on the tag. In embodiments, the initialization point (described above) may be based, at least in part, on the location of the tag 802 and/or the region of the object 804 that is visible in the field of view of the camera. However, in other embodiments, the user may receive a prompt or instruction to capture substantially the entire object 804 within the field of view of the camera.

Figure 9:
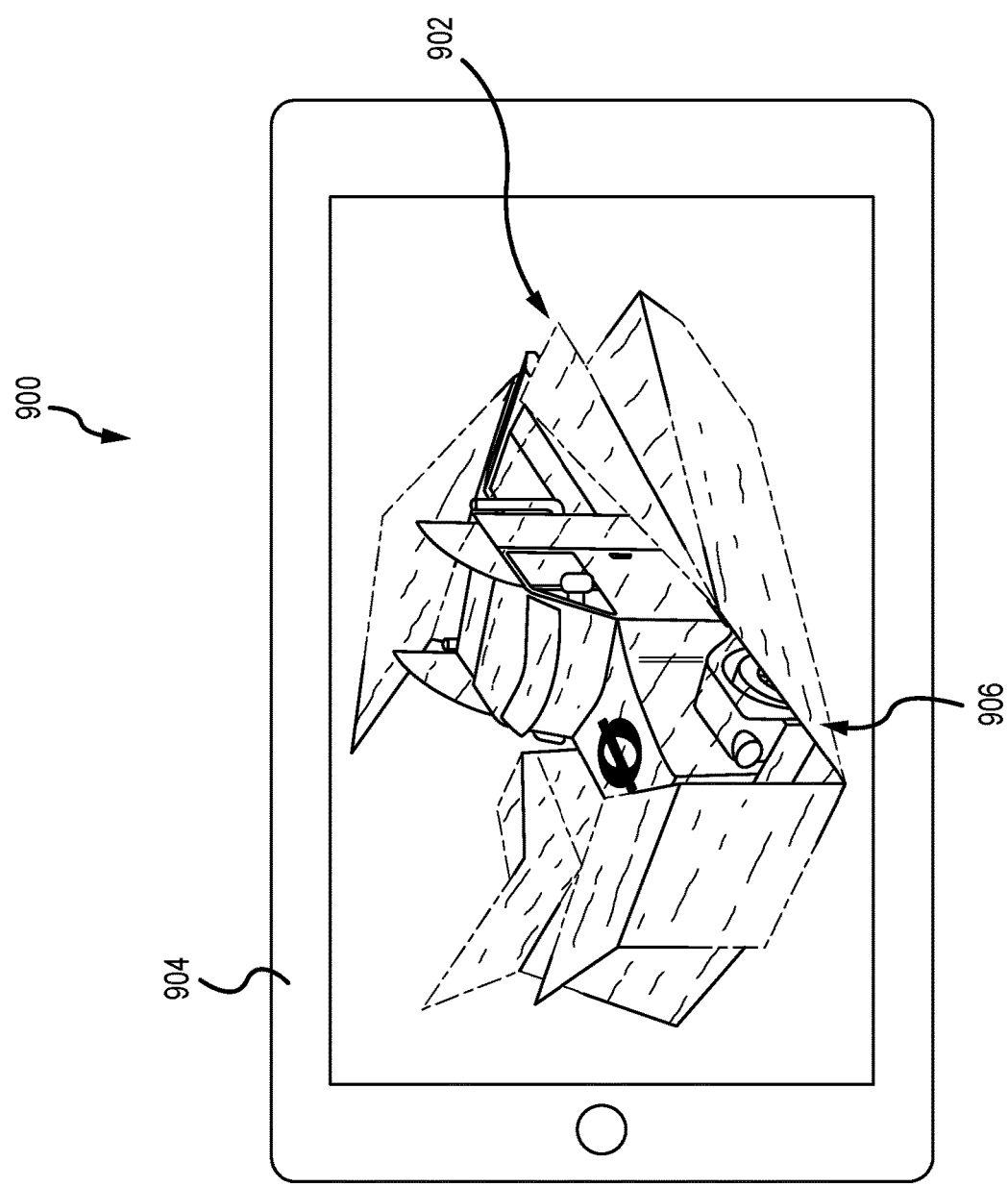
FIG. 9 illustrates an example situation of AR content presented in an AR environment in accordance with various embodiments.

FIG. 9 illustrates a situation 900 including an AR content element 902, within an AR application 904, generated in response to detection of a tag (such as the tag 802). In the illustrated embodiment, the object 804 is itself transformed into the AR content element 902, such that a texture 906 of the object 804 may also be implemented onto the AR content element 902. In various embodiments, a transition or graphical effect may be provided to illustrate how the object 804 is changed into the AR content element 902. For example, if the object 804 is a cardboard box, the animation may illustrate how the cardboard box is folded to generate the AR content element 902. In other embodiments, the transition or graphical effect may be a transition that obscures the change from the object 804 to the AR content element 902.

In the illustrated embodiment, the object 804 is utilized to form the AR content element 902, even when the entire object 804 was not utilized in the embodiment of FIG. 8. In various embodiments, the tag 802 may include information, that may be retrieved from a server or the like, including information about tag locations and various components of the object 804, such as an object size. Accordingly, the portion of the object 804 obtained in the field of view of the camera in FIG. 8 may still be utilized to generate the AR content element 902.

Figure 10:
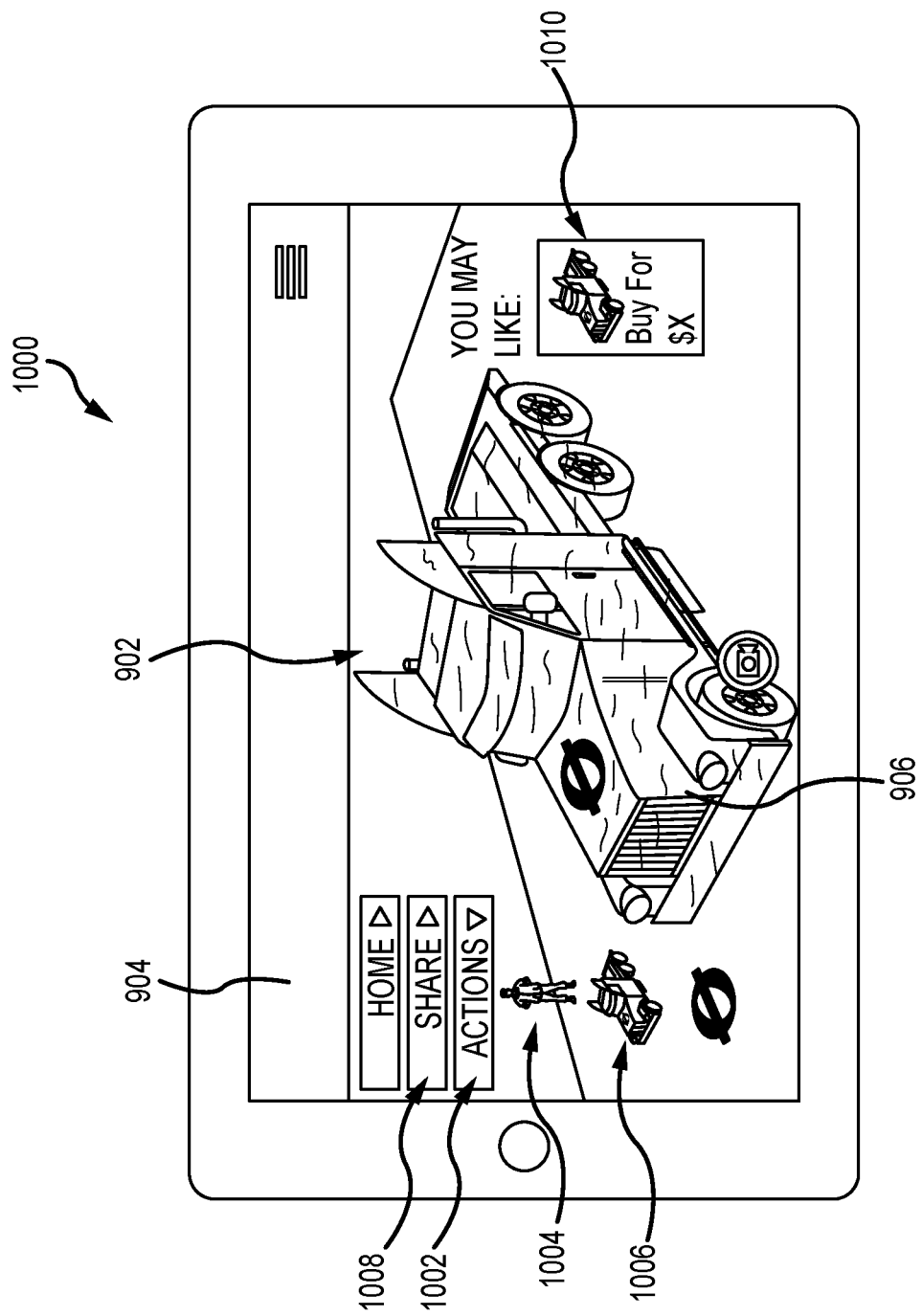
FIG. 10 illustrates an example situation of AR content presented in an AR environment in accordance with various embodiments.

FIG. 10 is a situation 1000 illustrating the AR content element 902 within the AR application 904. In the illustrated embodiment, the object 804 is wholly replaced with the AR content element 902, which is represented as a truck, similar to how the object was replaced with the house 610 above. The illustrated AR content element 902 includes the texture 906 associated with the object 804. For example, the tag 802 is still arranged on the AR content element 902. As a result, the user may receive a more immersive experience due to the rendering illustrating a change in the object 804, rather than a replacement. In various embodiments, the AR content element 902 may be associated with additional actions, such as actions selectable from an action menu 1002. For example, the action menu 1002 may include a change shape action 1004, which modifies the visual appearance of the AR content element 902, or an interact action 1006, which may cause the AR content element to have smoke come out of the exhaust of the truck, for example. Moreover, a share action 1008 may enable sharing via various social media platforms.

In certain embodiments, for example upon receiving permission from the user, a recommendation 1010 may also be provided on the display, for example, proximate the AR content element 902. For example, if the AR content element 902 is associated with a movie series or video game series, the recommendation 1010 may include a selectable element to an online marketplace to purchase the movie or video game, or other accessories. As noted above, the AR content element 902 may be associated with the particular user associated with the AR application 904, and as a result, the recommendations 1010 may be based on user history and the like to provide relevant recommendations.

As described above, in certain embodiments the user may interact with the AR content element 902. For example, the user may select an action from the action menu 1002 that records a series of steps that the user may store and post on social media. In various embodiments, the user's actions may drive the recommendations 1010 presented. For example, if the user moves into a gameplay mode, the recommendations 1010 may be directed toward other video games or the like. However, if the user selects the change shape action 1004 to a different component (for example, changing the truck to a boat), the provider may recognize that the user is interested in a different object, and thereafter updates the recommendations 1010 accordingly. Accordingly, in various embodiments, user actions may be utilized to drive the recommendations 1010 presented or to adjust the AR content provided to the users.

In various embodiments, the recommendations 1010 may be provided, at least in part, on the user's current interaction with the AR content. For example, historical browsing information may not provide information regarding the user's current desires or interests. Additionally, the AR content interaction may help the user generate additional interests that are new, and as a result, would not be present in historical browsing data. By way of example, if the AR content was related to astronomy and the user was highly engaged with the content, it may be beneficial to the user to receive recommendations based on astronomy, even if the user had not previously looked at related content. As a result, how the user chooses to interact may be evaluated and utilized for generation of the recommendations 1010. Utilizing a temporal approach to providing user recommendations may provide improved information to the user because the recommendations are likely to be relevant to a current state of mind or interest, as opposed to an interest from days or weeks in the past.

Figure 11:
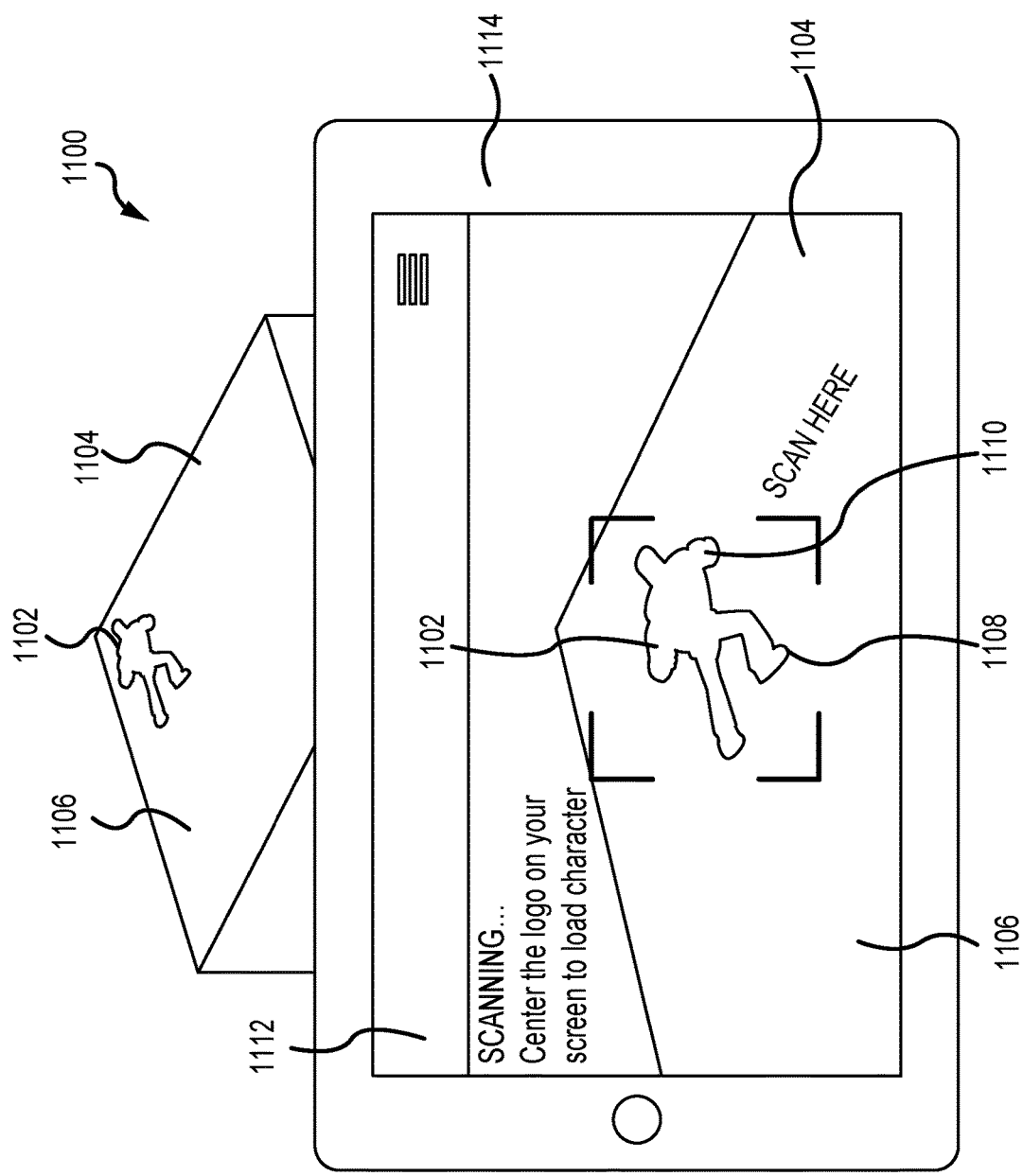
FIG. 11 illustrates an example situation including a field of view of an object including a tag for use in an AR environment in accordance with various embodiments.

FIG. 11 illustrates a situation 1100 including a tag 1102 arranged on an object 1104. In the illustrated embodiment, the object 1104 is a physical object, such as a box, and includes the tag 1102 on a top portion 1106 of the object 1104. As described above, in various embodiments, the tag 1102 includes a high contrast image, which may include text or symbols, that include dark regions 1108 arranged near light regions 1110. Moreover, in embodiments, an outline or structure of the tag 1102 may also be utilized as a trigger for generation of AR content. This information may be scanned by an AR application 1112 executing on a computing device 1114 and, upon recognizing the tag 1102, may launch AR content. The AR content may be tied to the tag 1102 and/or a user profile. For example, certain tags 1102 may be unique to particular products, such as a logo for a particular company that may generate AR content associated with products produced by that company. In other embodiments, the tag 1102 may be tied to certain events, such as seasonal events, or may be tied to one or more items purchased by the user or that user information indicates would be enjoyed by the user.

In various embodiments, it may be desirable to have the tag 1102 associated with a repeatable element that may be included on the packaging, such as a logo of the provider. This may enable the provider to continuously update the content and/or provide user-specific content. For example, if the tag is integrated into the logo for "Company A," the AR content may be triggered when the logo is scanned by the AR application 1112 and associated AR content may be directed to the user based on the user account of the AR application 1112. This may enable the provider to quickly update or modify the content, without changing the packaging utilized and/or reducing the ink used to form the packaging. For example, traditional advertising or promotional campaigns may include bright, highly decorated packaging. When the promotion ends, there may be additional packaging in inventory, which now may be obsolete for promotional purposes. Accordingly, the options may be to recycle the packaging or destroy the packaging, among others, which each present a loss to the provider for the cost with printing the packaging in the first place. However, integrating the tag into the logo enables common packing and updating the AR content provided by the AR application 1112.

Figure 12:
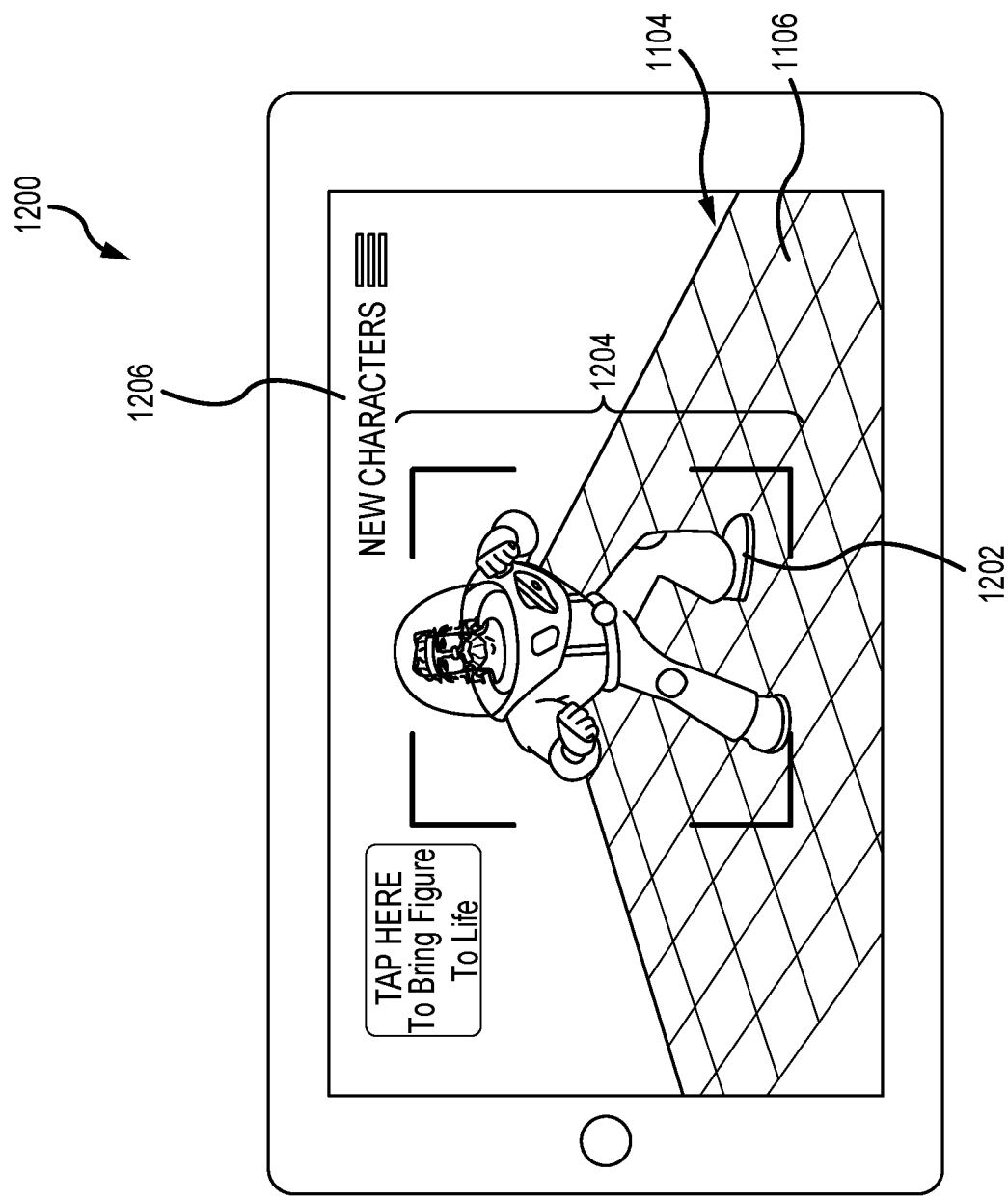
FIG. 12 illustrates an example situation of AR content presented in an AR environment in accordance with various embodiments.

In the illustrated embodiment, the tag 1102 may be associated with a promotion for a particular product and may, upon scanning, provide a collectible character or avatar, produced as AR content, to the user. FIG. 12 illustrates a situation 1200 where an AR content element 1202, in the form a digital character, is generated in response to scanning the tag 1102. The AR content element 1202 of FIG. 12 is positioned as standing on the top 1106 of the object 1104. In other words, the AR content element 1202 has not replaced the object 1104, such as in the embodiment of FIG. 10. As described above, in various embodiments, different views of the AR content element 1202 may be viewed by rotating or moving about the object 1104. For example, a back of the AR content element 1202 may be viewed by moving to the back side. However, in other embodiments, the AR content element 1202 may rotate or move with the user such that the AR content element 1202 is facing the computing device 1114.

It should be appreciated that a size of the AR content element 1202 may be adjusted based on the view within the display. For example, the illustrated AR content element 1202 has a height 1204. The height 1204 may be a function of a size of the object 1104 (e.g., a certain percentage) or a function of the area available within the display 1206. For example, it may be undesirable to render the AR content element 1202 with a size that has portions of the AR content element 1202 cut off or not visible on the display 1206. Accordingly, it may be beneficial to scale and adjust the height 1204, among other dimensions, based on an available area of the display 1206. As the user moves further or closer to the object 1104, the AR content element 1202 may be resized. However, in other embodiments, movement may be useful for evaluating or focusing on particular aspects of the AR content element 1202, and as a result, the size may not change.

Figure 13:
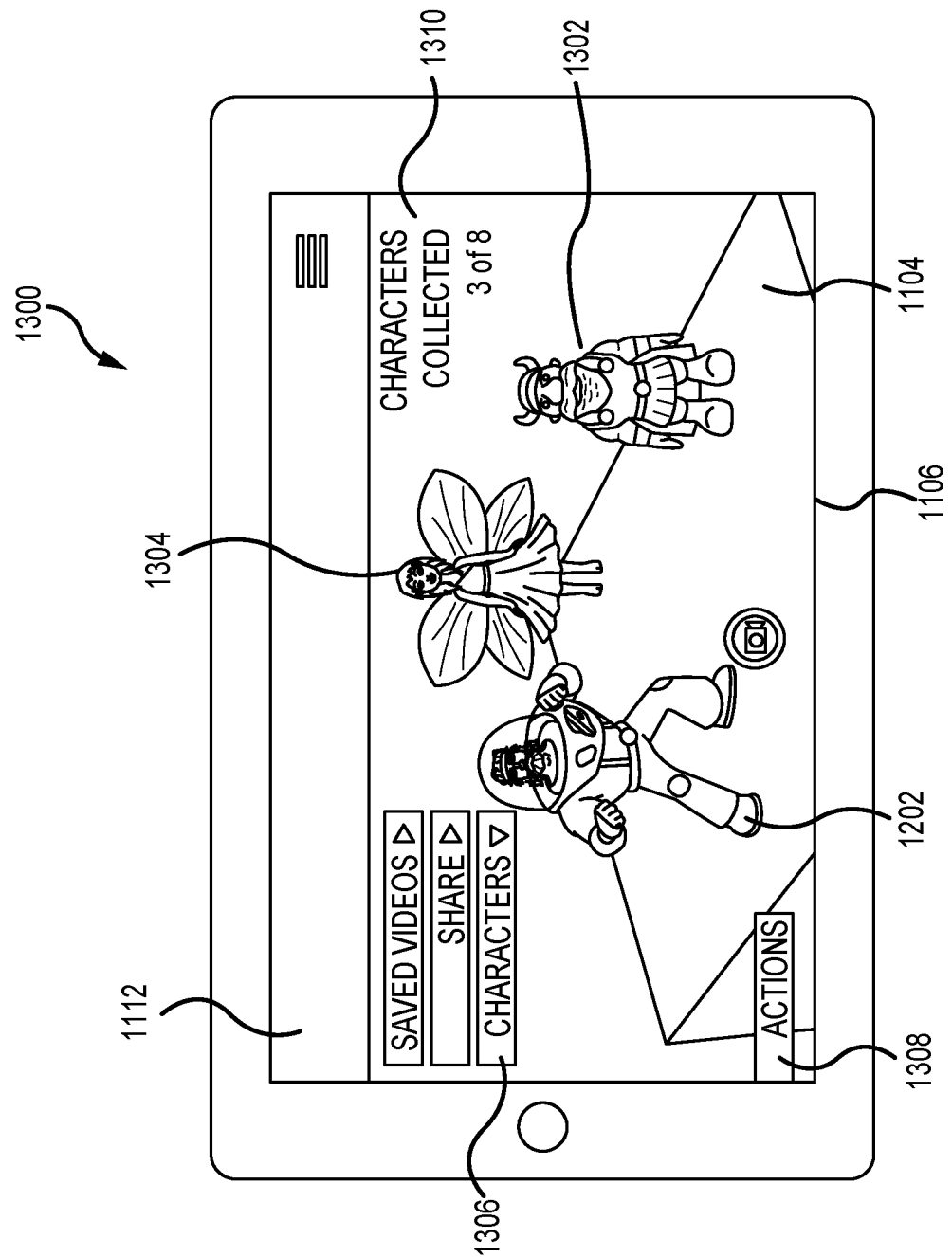
FIG. 13 illustrates an example situation of AR content presented in an AR environment in accordance with various embodiments.

FIG. 13 is a situation 1300 illustrating the AR content element 1202 along with a second AR content element 1302 and a third AR content element 1304 arranged along the top 1106 of the object 1104. In various embodiments, the tags may be tied to promotional consideration, such as with an upcoming movie release or the like. As a result, scanning the tag may provide an AR content element, in the form of a character from the movie, which may be collected. That is, scanning a tag may provide one AR content element. Scanning a second tag may provide another AR content element. In embodiments, the AR content elements may be randomly assigned to the users. Additionally, in embodiments, the AR content elements may be tied to user profiles such that users to do not receive duplicate avatars. The illustrated AR application 1112 includes a collections menu 1306 and an actions menu 1308 for selection and interaction with characters already collected by the user. In embodiments, a collections menu 1310 may enable the user to track their collections. Accordingly, the user may be provided with an incentive to obtain different packages and/or otherwise collect the different avatars.

In various embodiments, the AR content elements 1202, 1302, 1304 may be interactable with one another. That is, the AR content element 1202 may interact with the second AR content element 1302, for example, upon receiving a command or instruction from the user. In various embodiments, the instructions may be preloaded from a list, for example the above-described action menu, to enable interaction between the AR content elements. In various embodiments, relative sizes of the AR content elements 1202, 1302, 1304 may be adjusted relative to one another. For example, if one AR content element is for an adult and another is for a child, it may be undesirable to have them appear as being the same size. Information for rendering of the objects may be obtained, for example, from a data store or the like that includes graphical representations for use with the AR application 1112.

In various embodiments, messages and the like may be incorporated into the AR application 1112. For example, a status menu 1310 may be included, which may provide information to the user regarding a number of different items collected. Additionally, information may be provided where users can obtain additional AR content elements. In certain embodiments, this information may be provided in the form of a recommendation, as described above, or another option, such as messages that are provided to the user at intervals.

It should be appreciated that, in various embodiments, the content may be randomized or partially randomized. For example, upon receipt of the tag 1102, a table or pool of content may be evaluated and selected. In certain embodiments, selection may be weighted. For example, items that have already been received may not be selected a second time. Additionally, users that have reached a threshold amount of activity may be weighted toward more "rare" items. Furthermore, in certain embodiments, information from the user profile may, at least in part, affect how items are weighted. In embodiments, rescanning the tag 1102 will not provide additional content, as the tag 1102 may have a useful life of providing a single item or piece of AR content. However, in embodiments, the amount of content elements may be based on information obtained from the user profile. For example, if the user purchases an item and receives that item within an object that includes a tag, the user may receive a first piece of AR content. Subsequent scans of the tag may provide no additional content. However, if the user purchases an accessory or a second item, a subsequent scan of the tag may provide a second piece of AR content because the second purchase may be tied to the user account.

Figure 14:
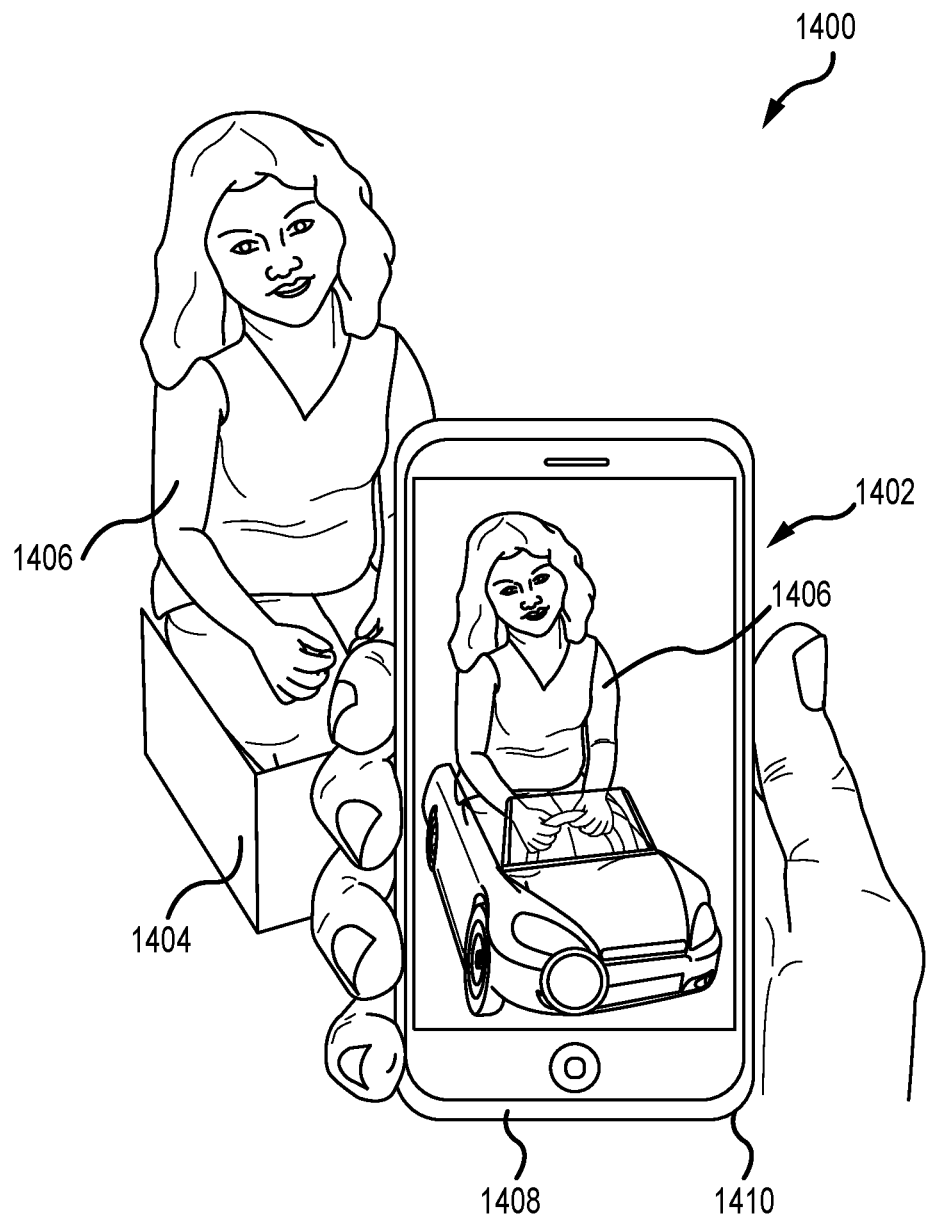
FIG. 14 illustrates an example situation of AR content presented in an AR environment in accordance with various embodiments.

FIG. 14 illustrates a situation 1400 illustrating an AR content element 1402 generated based on an object 1404. In the illustrated embodiment, a person 1406 is arranged within the object 1404, which is illustrated as a box in the illustrated embodiment. An AR application 1408 executing on a client device 1410 renders the AR content element 1402, which transforms the object 1404 into a representation of the person 1406 sitting within a car. In various embodiments, the mapping of the object 1404 may be utilized to provide the boundaries, at least in part, of the AR content element 1402. For example, if the person 1406 were not sitting in the object 1404, the back would be visible. However, the person 1406 blocks the back, and as a result, the representative image illustrated on client device 1410 obscures the back. Accordingly, the representation may be described as being accurate to the experience, in that, the AR content 1402 does not include portions that are otherwise blocked by the person 1406. As a result, the user may be integrated into the experience. In certain embodiments, the rendering may be based, at least in part, on the visible portions of the object 1404. That is, only the portions of the object 1404 visible by the client device 1410 may be rendered, which may conserve computing resources. In other embodiments, the AR content may be rendered and the person 1406 may be inserted into the content to cover or otherwise obscure certain portions. For example, a depth of the AR content may be determined and the relative location of the person 1406, with respect to that depth, may drive how the content is rendered. In various embodiments, different additional components described above may be associated with the AR application 1408, such as social media integration. As a result, the user that cannot see the AR content on the screen may receive direction as to how to interact by using the physical device. For example, the user 1406 can see the physical object 1404 and know to sit in it.

Figure 15A:
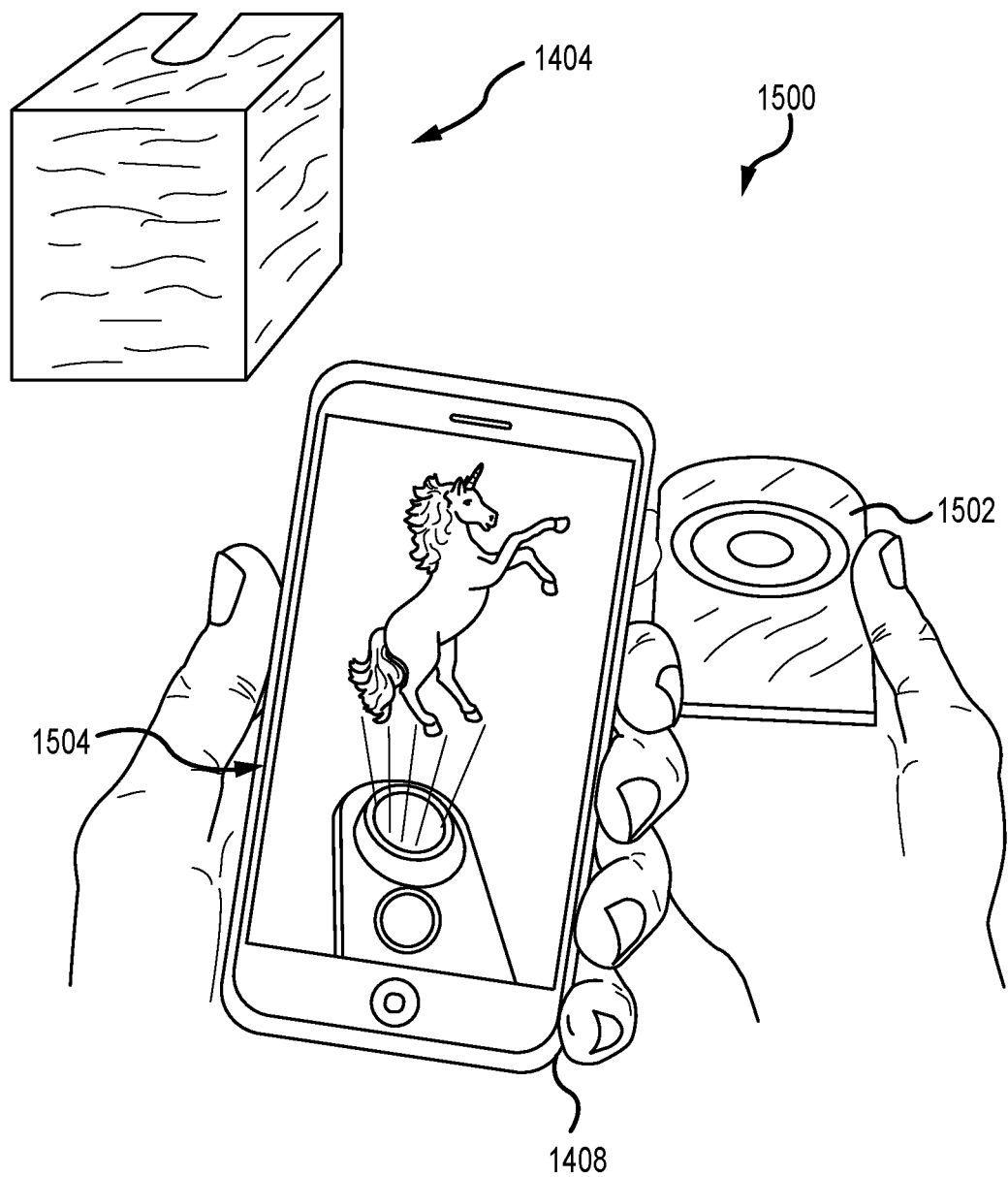
FIG. 15A illustrates an example situation of AR content presented in an AR environment in accordance with various embodiments.

As noted above, the object 1404 may be utilized to provide a physical restraint on the AR content element 1402. That is, the mapping of the object 1404 may constrain the areas where AR content is generated. Advantageously, this enables the physical form factor of the object 1404 to be manipulated to enable a variety of different applications. For example, the object 1404 may include cutouts or patterns that users can remove in order to generate additional AR content. FIG. 15A illustrates a situation 1500 where a pattern 1502 is removed from the object 1404. As a result, the pattern 1502 is not encumbered by the object 1404, which may be larger than the pattern 1502, and therefore enables the user to interact with the pattern 1502 in different ways. The AR application 1408 may recognize the pattern 1502, which may include features representative of a tag, and generate an AR content element 1504 based on the pattern 1502. For example, in the illustrated embodiment, the AR content element 1504 is a unicorn extending upward from the pattern 1502. Users may obtain different patterns 1502 to evaluate the different types of AR content elements that may be associated with the patterns. As noted above, the patterns 1502 may be associated with promotional consideration and the like, such as upcoming movies or television programming.

In certain embodiments, removing the patterns 1502 from the object (e.g., from a box) may be used to limit interaction with other components. For example, the box, as a whole, may have certain AR content associated with the entire box. Upon removal of one or more patterns 1502, the AR content associated with the box as a whole may be unavailable. Such a progression may be incorporated into a game or activity using the packaging. By way of example, the packaging may be a box that is incorporated into a detective game. The user may scan the box, looking for clues, and receive a prompt to remove certain portions or patterns. The user may then scan those clues to advance the game. Upon completion, the original packaging may be in several pieces, which may provide an indication, when scanned, that the activity has already been completed.

In certain embodiments, patterns 1502 from a variety of different objects may be combined in order to generate a unique experience for the user. For example, a user may remove a first pattern from a first object and a second pattern from a second object. These two patterns may be propped up or otherwise staged to interact with one another, which may not be feasible if the user were trying to interact with the entire object. Thereafter, the user may utilize the AR application 1408 to see how the patterns interact with one another. By way of example, the first pattern may correspond to a T-Rex dinosaur and the second pattern may correspond to a Velociraptor. The AR application 1408, upon recognizing the first and second patterns, may provide AR content of three-dimensional dinosaurs interacting with one another or positioned near one another. As a result, the user may receive a visual indication regarding the difference in size between the two dinosaurs, among other information.

In various embodiments, the patterns 1502 that may be removed from the objects may be advantageous and preferable to using the entire object because the patterns 1502 may be smaller and therefore more easily storable and collectable. In other words, it may be easier for the user to save a cut out than an entire box. Moreover, as noted above, the patterns 1502 may provide an opportunity for interaction with the user. For example, it may be difficult to interact with a large box, such as one with dimensions of approximately 3 feet×2 feet×3 feet, for a person having a smaller stature. However, the cutout can be easily manipulated and adjusted, as illustrated in FIG. 15 where the user can easily hold the pattern 1502 in one hand. In various embodiments, the patterns 1502 include a variety of different sizes and shapes, which may each correspond to unique content when utilized with the AR application 1408.

Figure 15B:
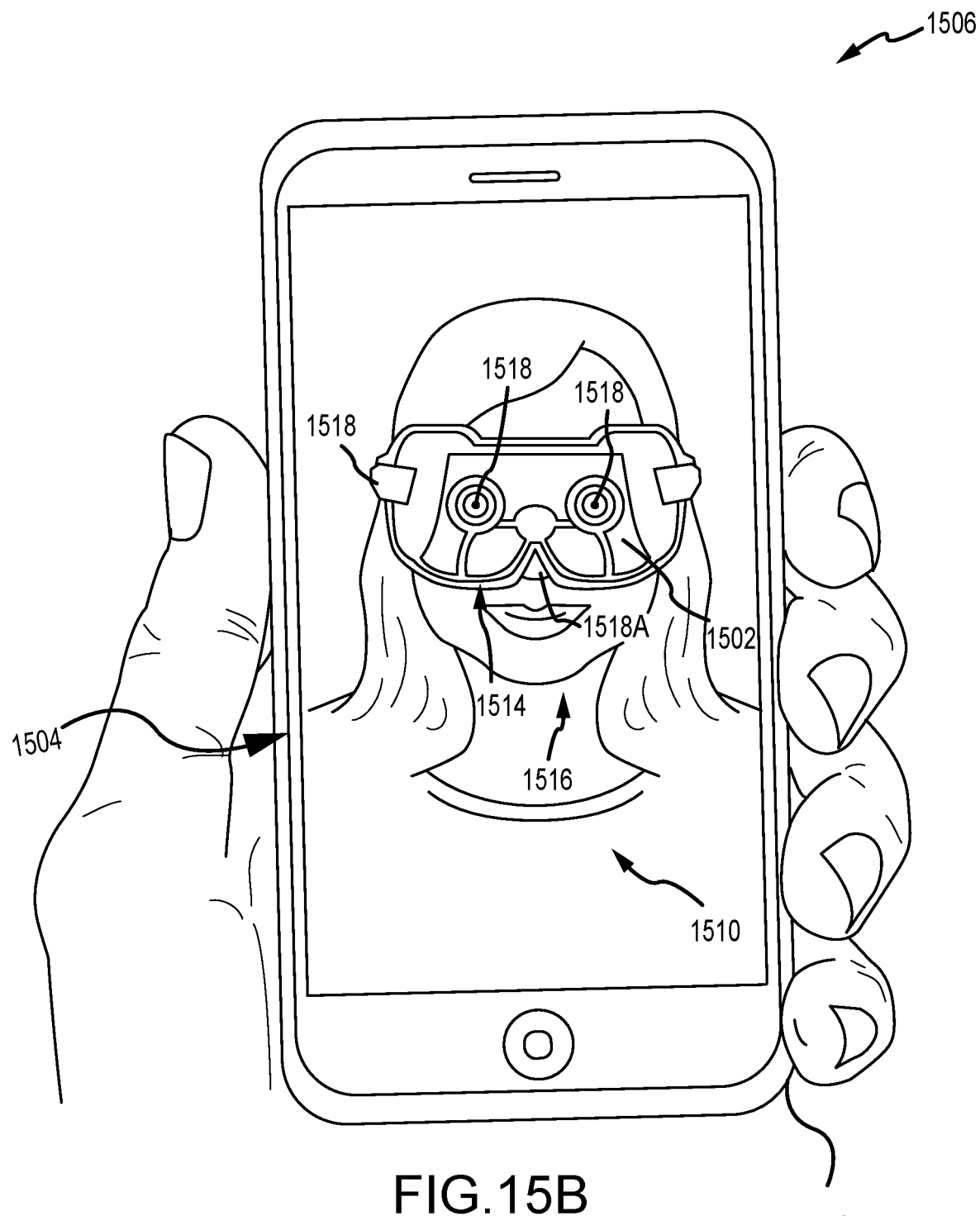
FIG. 15B illustrates an example situation of a user interaction with an object in accordance with various embodiments.
Figure 15C:
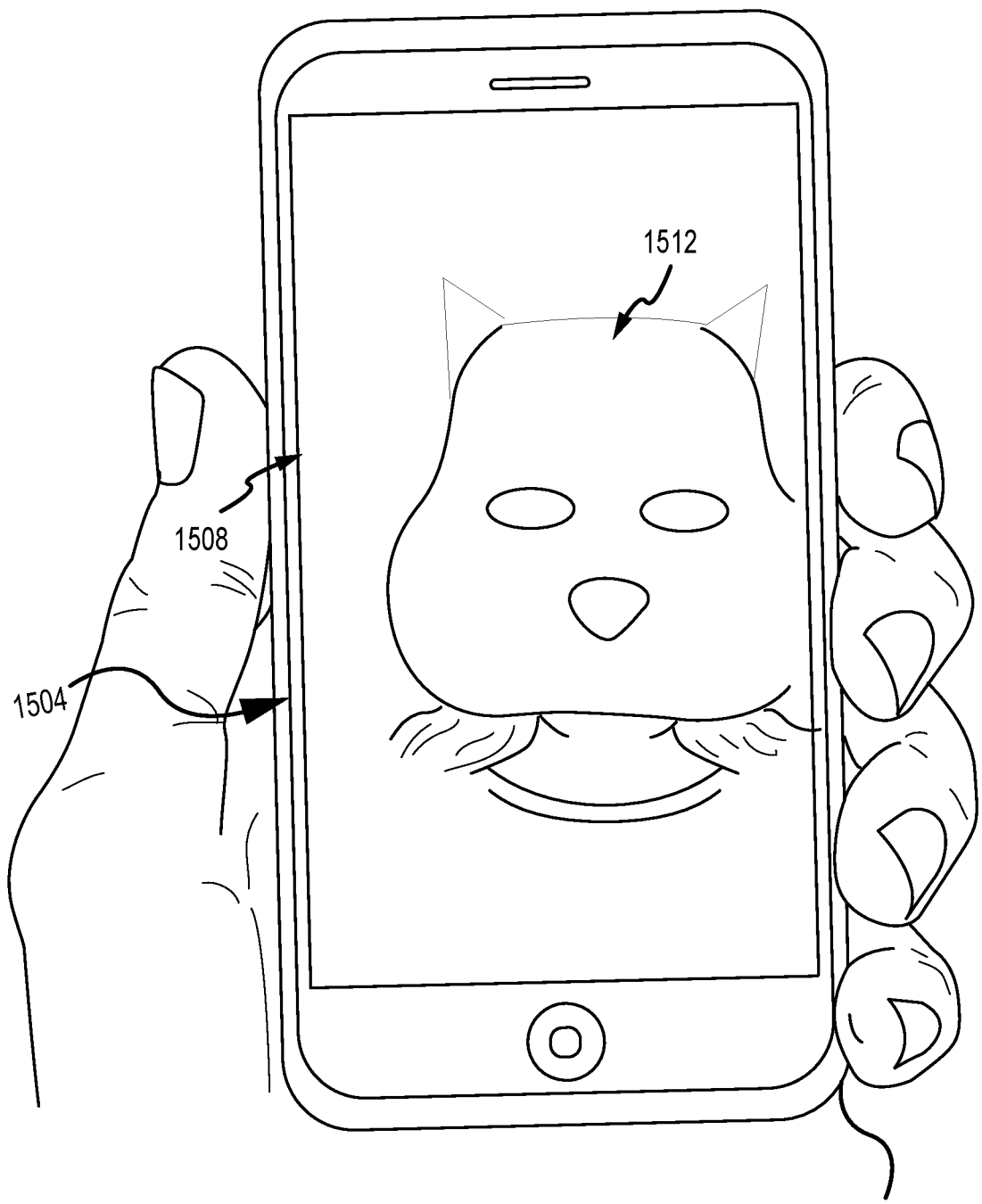
FIG. 15*c* illustrates an example situation of AR content presented in an AR environment in accordance with various embodiments.

FIGS. 15B and 15C illustrate example environments 1506, 1508 where a user 1510 is interacting with the pattern 1502 to receive AR content 1512. In the illustrated embodiment, the user 1510 may utilize a user device that includes a front facing camera, for example, in a "selfie" mode where the user is positioned within the image taken by the user device. The pattern 1502 illustrated in FIG. 15B includes a wearable item having a tag 1514, which may be indicative of the AR content 1512 associated with the pattern 1502. For example, the tag 1514 may include information, such as metadata and the like, to facilitate generation of the AR content 1512. The user 1510 of FIG. 15B arranges the pattern 1502 along a face region 1516 that may include one or more markers 1518, which may be used to generate the AR content 1512. For example, an arrangement of the pattern 1502 may correspond to different features of the face region 1516. By way of example only, the pattern 1502 may be shaped to fit around the marker 1518A, which corresponds to the user's nose. Accordingly, rendering of the AR content 1512 may use the marker to generate the AR content 1512. It should be appreciated that other techniques, such as facial recognition, face tracking, and the like may be utilized for generation of the AR content 1512.

FIG. 15C illustrates the AR content 1512 generated as a result of the pattern 1502. In the illustrated embodiment, a cartoon cat is rendered over the user's face. In certain embodiments, as described above, the dimensions of the cartoon cat may be based, at least in part, on metadata stored within the tag 1514, the markers 1518, or the like. Accordingly, the user now has a direct interaction with the pattern 1502 to generate a pleasing effect. In various embodiments, the user may be provided with options to share the AR content 1512, for example, via a social media application. In certain embodiments, the social media application integration may include a watermark or other indication directed to the provider of the AR content 1512, or may include a pre-generated message that includes one or more hashtags or other tracking devices to facilitate branding or evaluation of sharing metrics.

Figure 16:
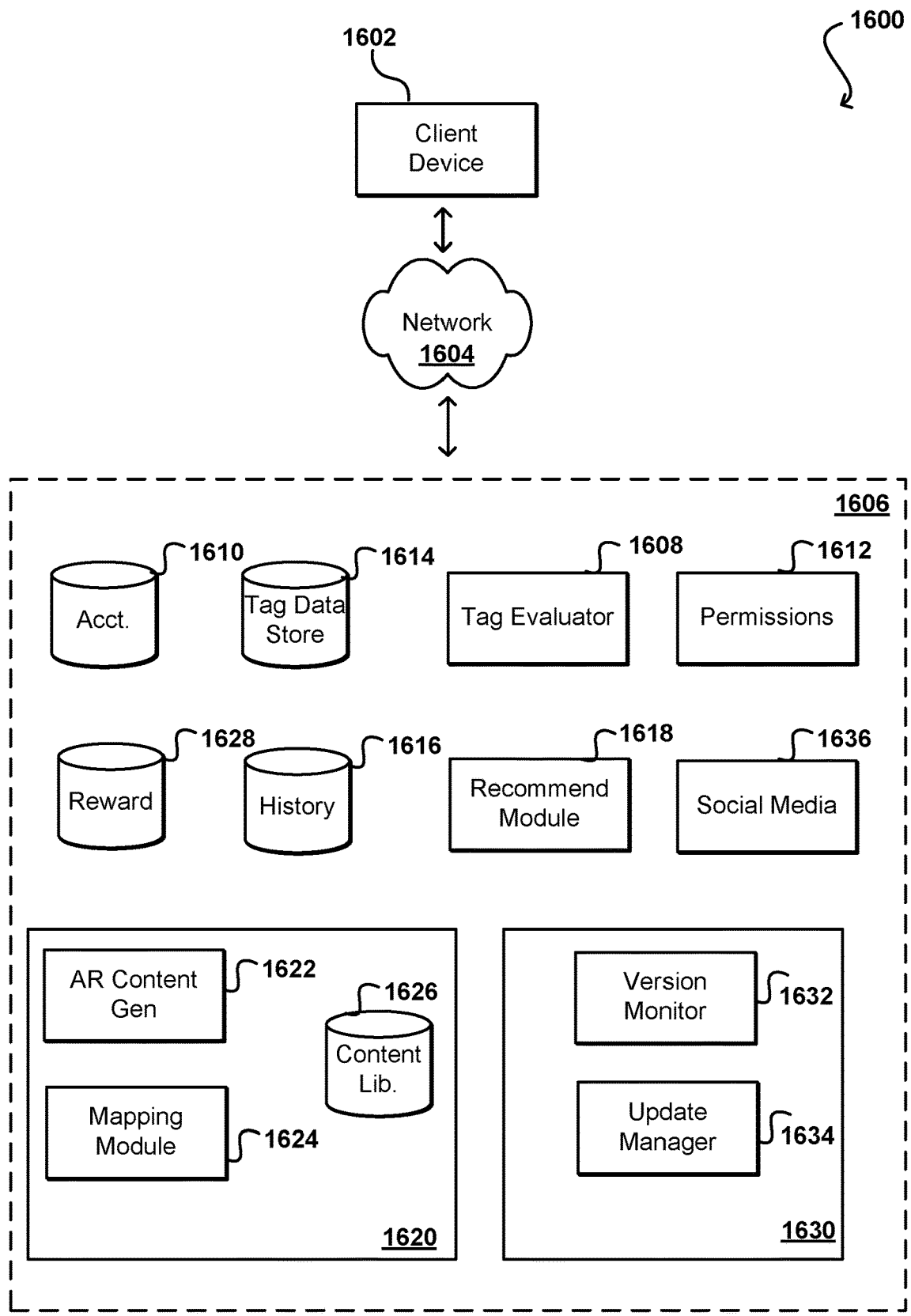
FIG. 16 illustrates an example AR application environment that can be used in accordance with various embodiments.

FIG. 16 illustrates an example environment 1600 in which aspects of the various embodiments can be implemented. In the example, a client device 1602 may transmit information, via a network 1604, to an AR application environment 1606. In various embodiments, the information includes at least a visual representation of an object, which may include a tag. The tag may be evaluated by the tag evaluator 1608 to determine further processing. For example, the tag may include a high contrast representation that identifies certain AR content associated with the object, among other things. The tag evaluator 1608 may determine if the tag is associated with a particular promotion or the like, which may lead to launching of AR content on the client device 1602.

In embodiments, the tag evaluator 1608 may be continuously updated, for example from a remote server or another module, to direct various tags to different types of AR applications and content. For example, in an embodiment where a tag is tied to a promotional event, such as an annual sale or a seasonal event, the tag may be directed toward content directed toward that sale for a period of time before the promotional event, but then updated after the promotional event for direction to a different set of content. Accordingly, the tag evaluator 1608 may be utilized to evaluate and direct further processing for selecting and presenting AR content.

In certain embodiments, an account data store 1610 is evaluated to determine whether the user of the client device 1602 has a registered account. In various embodiments, the registered account may be used to dictate one or more parameters of the user experience. For example, the user may have a registered account associated with an elevated status or membership level. Additionally, as noted above, the registered account may include information indicative of interactions with different tags or the like. If not, the user may be prompted to establish an account. The user account may be tied to a provider, such as a provider for an online marketplace, which enables the user to purchase items, which may be delivered in various types of packaging. As described above, various authentication methods may be utilized to identify the appropriate user for a given application. If there is a recognized user account, then a permission module 1612 may evaluate various authorizations provided with the account. The authorizations may be related to data collection, data sharing, and the like. These authorizations may be provided explicitly by the user. In other words, the user may agree to have information tracked and stored in order to provide an improved user experience, for example, by providing recommendations, saving shipping and payment information, and the like. The permissions may also be updated and changed by the user. Furthermore, in various embodiment, it should be appreciated that data may be anonymized such that identifying characteristics of users (e.g., names, etc.) are not associated with various components of information. For example, if a user were to upload a photograph of themselves to associate with their account, the account may be assigned an identification number and the photo and/or name of the user would not be utilized to identify information about the user.

In various embodiments, one or more data stores 1614 may store information related to the tags, such as ongoing promotions, available applications, or the like. For example, the tag data store 1614 may include different types of available tags with associated AR content. In embodiments, the tag data store 1614 may also include metadata related to the tags, such as dimensional information and the like, which may be utilized in generation of the AR content. For example, as noted above, different tags may correspond to objects having a variety of sizes. The tags may include metadata that provides dimensional information for the objects for rendering three-dimensional AR content. The permission module 1612 regulate, at least in part, which promotions may be associated with certain users. For example, age restrictions may prevent promotions associated with mature material from being directed toward particular users. Similarly, a user that restricts certain data collection may not be provided with promotions or content linked to social media sharing, as the user may prevent such integration across the platform. In embodiments, the one or more data stores 1614 may include promotional or event information that is tied to particular users based on a variety of aspects, such as geographic location, age, and the like. For example, during the month of July a user in the Northern Hemisphere would be directed toward content related to the summer while a user in the Southern Hemisphere would be directed toward content related to the winter.

Information obtained from the data store 1614 may be compared to a user history 1616 to enable a recommendations module 1618 to provide particularized content to the user. For example, the data store 1614 may include an ongoing promotion for a new movie associated with a tag. The user may enable recommendations, and based on the user history, the user may have watched or purchased previous movies or related movies. Accordingly, the recommendation module 1618 may provide a recommendation, within the AR content described above, associated with items related to the promotion.

Upon selecting an appropriate promotion or other application, an AR module 1620 may generate AR content via an AR content generator 1622. As described above, the AR content may be related to a game, an avatar, a user experience with an object, or the like. A mapping module 1624 may evaluate an object associated with the tag in order to establish an initialization point, or the like, for the AR content. For example, in embodiments where the object is a box, the mapping may determine a relative size and location of the box for generation of content on the client device 1602. In another example, where the object is a tube, the mapping may determine a shape of the tube such that generated content may integrate with the tube. Content may be obtained from a content library 1626, which may include preloaded content for different promotions, applications, and the like. In various embodiments, third party developers may provide content for new applications or promotions that are provided via the AR application environment 1606. Additionally, content may be added and removed periodically to update the AR content for users, and as a result, promotions and applications may be rapidly updated by adjusting how tags correspond to AR content. Advantageously, this may be done electronically, as opposed to traditional promotional events that may have directly printed the promotions on the packaging, which may become obsolete before all of the packaging is used.

In embodiment, use of the AR content may trigger a reward, for example, the user may receive a token or a prize for performing a certain activity. By way of example only, a user that achieves a certain score on an AR game may receive a discount coupon. A reward database 1628 may include the digital rewards that are provided to the user. Furthermore, the rewards may be tied to user information, which may be tied to the user account. For example, a user with a particular membership status may receive improved rewards or may have their rewards weighted toward a certain category. Additionally, past user history may also be utilized to assign rewards. For example, if the user has purchased a digital media player from the provider, rewards that provide discounts to digital media that may be utilized with the player may be provided.

In various embodiments, the AR content may be tied to a user account and/or to the tag. As a result, the tag may be set to be single use only, in that, the user may scan the tag and receive one item (such as one avatar) or have a limited time in which to interact with an AR game provided via the tag. Accordingly, in this instance, single use may refer to having the ability to obtain a single content item or single interaction until additional information is provided to enable additional content items. For example, as described above, the user account may include information indicative of how tags provide content, and as a result, a single tag may provide multiple pieces of content if the user account includes different permissions or the like. Accordingly, obtaining content may also be described as "spinning a wheel" where the user account includes information that provides one or more spins, even if the same tag is utilized to provide the spins. In other embodiments, the content may be available as long as the user keeps the object. A management environment 1630 may regulate how users interact with the AR content. For example, a version monitor 1632 may track what version of content is presented, how often a user has accessed the content, and the like. In various embodiments, the version monitor 1632 may also track how the tag may be utilized, such as continuously or single use. The illustrated embodiment also includes an update manager 1634, which may be used to roll out updates or new AR content. For example, if a promotion has ended, the update manager may be utilized block content related to the expired promotion, and in certain embodiments, replace it with updated content. Additionally, as versions of AR content as revised, such as updates to games and the like, the update manager may also transmit these updates so that users may experience the latest versions. In various embodiments, portions of AR content may be transmitted to the computing device upon activation of the tag. However, in other embodiments, the AR content may be cloud-based and accessed over the network. It should be appreciated that transmission of information may be adjusted based on data transmission restrictions.

In certain embodiments, the environment 1600 further includes a social media module 1636, which may facilitate interaction with various social media platforms. For example, upon receipt of permission from the user to link social media platforms to their account, the social media module 1636 may generate posts and social media content that the user may use with their account. For example, if the user interacts with AR content and wants to screenshot the AR content, the social media module 1636 may take the screen shot, provide a draft message, and also provide tracking features, such as hashtags, to go along with the social media post. As a result, a user's activity on social media may be tied to the AR content. In various embodiments, the user may be encouraged or rewarded for integrating the social media platforms. For example, if the user posts a threshold amount of content, the user may be rewarded with additional AR content or the like. Additionally, if the user's posts reach a threshold number of comments, shares, likes, etc., the user may also be rewarded.

Figure 17:
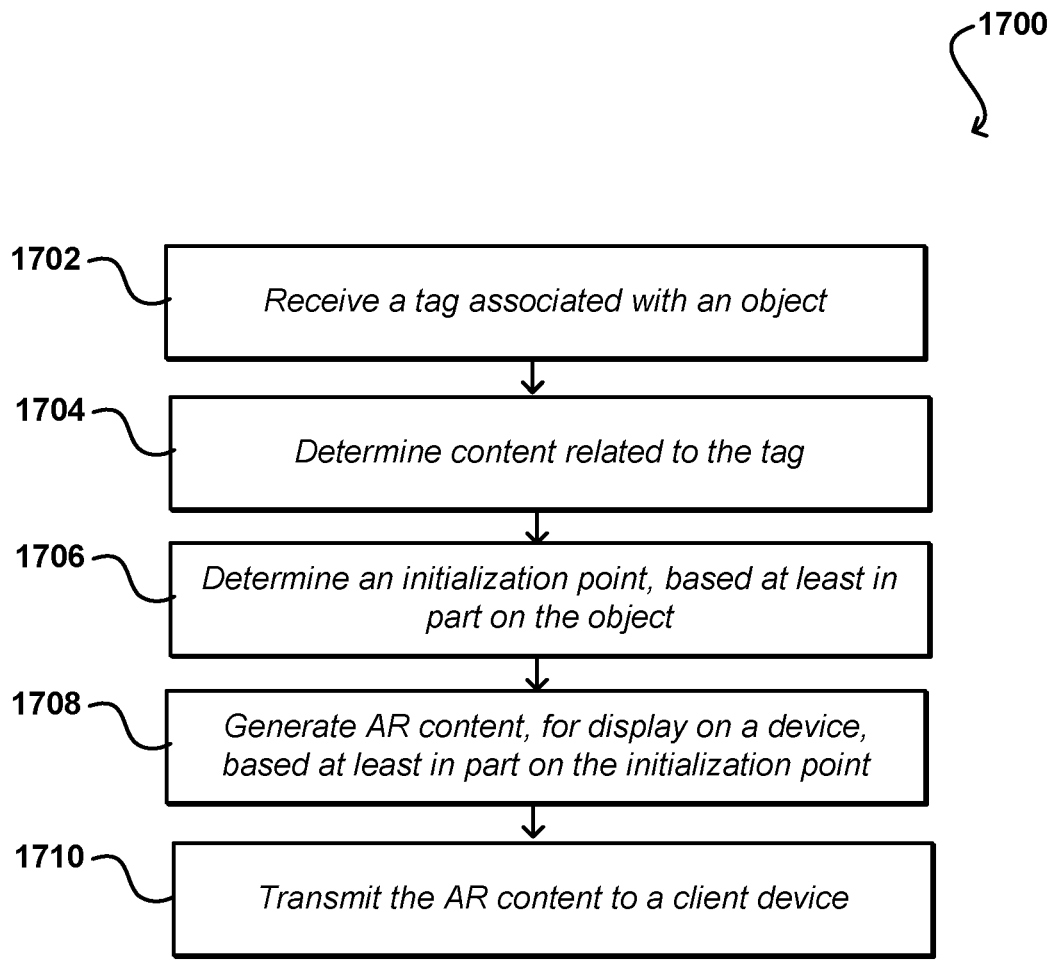
FIG. 17 illustrates an example process for providing AR content in accordance with various embodiments.

FIG. 17 illustrates an example method 1700 for presenting AR content on a computing device. It should be understood that there can be additional, fewer, or alternative steps performed in similar or alternative orders, or in parallel, within the scope of the various embodiments unless otherwise stated. The example begins with receiving a tag associated with an object. 1702. As noted above, the tag may be received at an AR application environment that analyzes the tag to determine whether the tag is associated with an ongoing AR promotion or the like. In various embodiments, the tag is transmitted over a network in the form of a live camera view obtained from a client device utilizing an AR application executing on the client device. For example, the user may load an application, that includes access to a camera of the client device, and transmit a live camera view of an object, such as a package used to deliver a purchased item, that includes the tag.

In embodiments, content, such as AR content, related to the tag is identified 1704. The tags, as described above, are graphical markers that may trigger or enable AR content. In various embodiments, the tags are agnostic to ongoing campaigns or packaging, such as being integrated into a generic symbol or a logo. As a result, campaigns may be updated without modifying tags. However, in embodiments, the tags may be associated with campaigns or the like. For example, tags may correspond to ongoing promotions, advertisements, applications developed by partners, or user history, among various other data sources. In certain embodiments, for example, a particular tag may be associated with particular AR content, which may be made available to a user upon receipt of an object including the tag. An initialization point is determined 1706. The initialization point may coordinate to an x-y-z location of the object, or at least a portion of the object, in physical space, with respect to the client device. For example, a mapping may be generated over at least a portion of the object.

In various embodiments, AR content is generated for display on the client device 1708. For example, in embodiments, the AR content may include content that replaces the object, as illustrated above. In other embodiments, the AR content may interact with the object. This content may be stored and associated with particular tags, such that the content may be transmitted to the client device 1710. In embodiments, at least a portion of the content may be downloaded to the client device, for example, to assist with run times or the like. However, in other embodiments, the AR content may be streamed or otherwise obtained from a remote server. In this manner, users may obtain AR content based on a tag associated with a physical object, such as packaging. Moreover, the tags may be associated with or tied to the item and/or a user profile associated with the tag.

Figure 18:
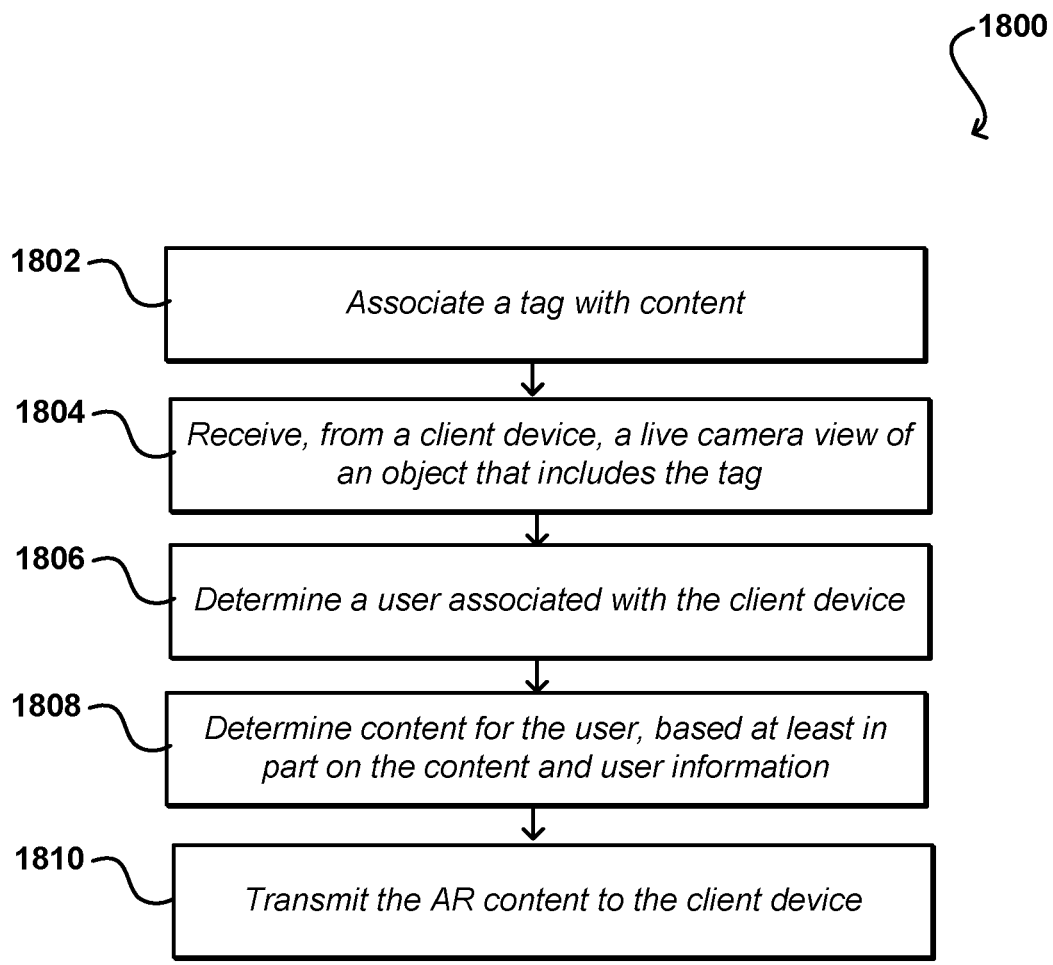
FIG. 18 illustrates an example process for determining AR content in accordance with various embodiments.

FIG. 18 illustrates an example method 1800 for determining AR content for presentation on a client device. This example begins with associating a tag to content 1802. For example, a particular tag may be related to an ongoing or upcoming promotion, to a particular product, or the like. As described above, the tag may correspond to a high contrast image that is detected by an AR application executing on a client device. The tag, for example, may be particularized for certain content. By way of example, a logo may be associated with content related to products associated with the logo (e.g., a sports team logo may be associated with content related to the sport that team is involved with). The tag may be associated with various different types of content, which may change over time. For example, tags may be updated to associate with different content based on various events, such as time of day, geographic location, and the like.

In various embodiments, a tag is received from a client device 1804. For example, the tag may be in the form of an image, such as a live camera view, sent from a client device operated by a user. In embodiments, the user executes a specialized application for display of AR content, which may be registered to the user. As a result, the user may be determined 1806. For example, a user account may be associated with the AR application, to enable identification of the user. In various embodiments, the AR application may be associated with a provider with which the user is already familiar and/or already has a history. In embodiments, the information from other services provided may be incorporated to facilitate identification of the user.

Content, such as AR content, is determined for display on the client device 1808. In various embodiments, the content is determined based at least in part on the content associated with the tag and/or user information, such as information obtained from the user account. For example, if the tag is associated with an ongoing promotion, that information may be utilized to generate the AR content. Additionally, if the tag is associated with an item purchased by the user, the AR content may be related to the item that the user purchased. As a result, an immersive experience can be provided that's related to the user's interests and recent purchase. The content may then me transmitted to the client device 1810.

Figure 19:
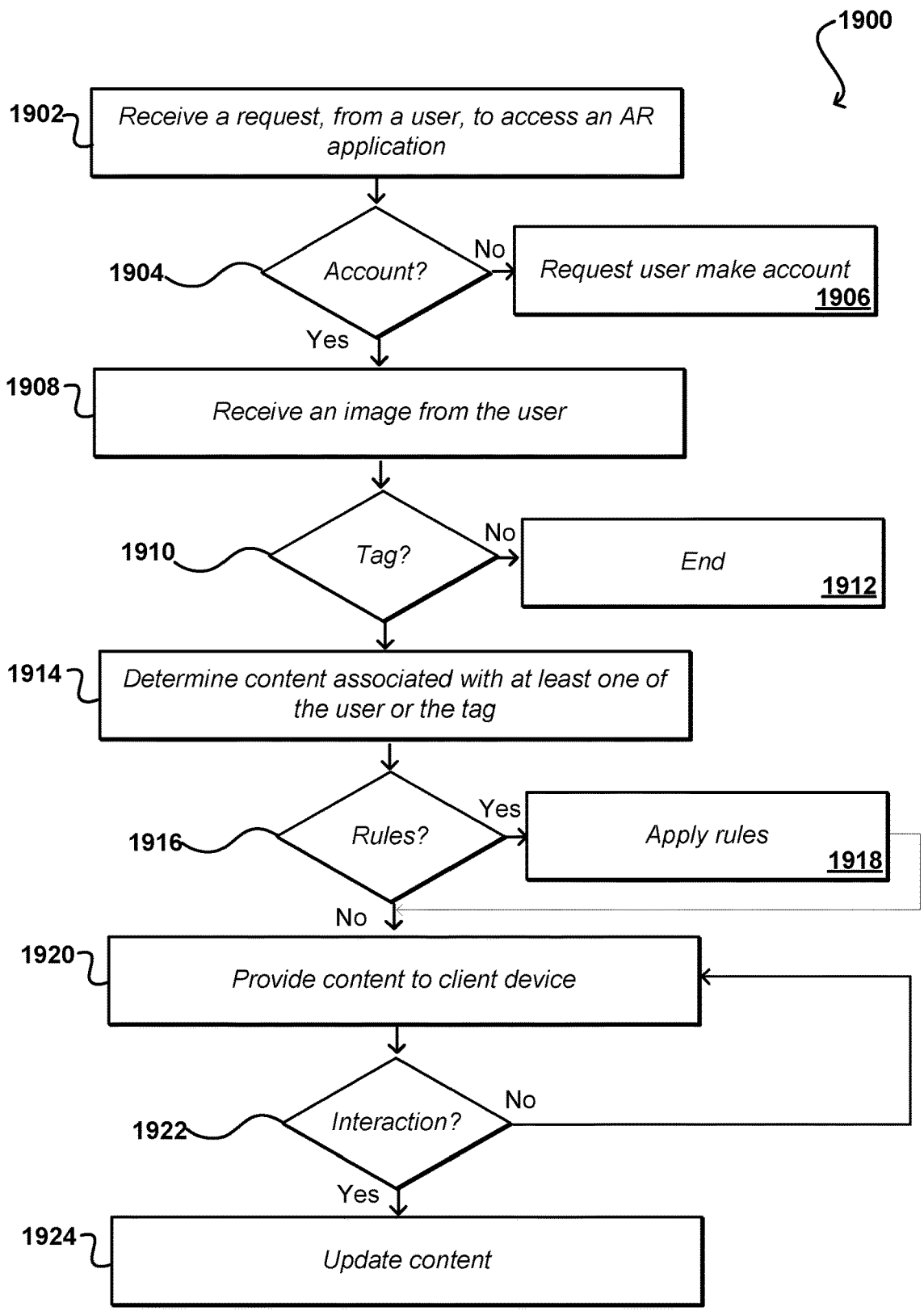
FIG. 19 illustrates an example process for providing AR content in accordance with various embodiments.

FIG. 19 illustrates an example method 1900 for providing AR content to a client device. This example begins with receiving a request to access an AR application 1902. For example, the AR application may be associated with a provider, which may also provide additional services, such as an online marketplace. The provider may determine if the request is from a user with an active account 1904, and request that the user make an account if one is not active 1906. Additionally, in embodiments, alternative content may be provided to the user. If the user has an account, the provider may grant access to the AR application. The provider receives, from the user, an image 1908. In embodiments, the image is a live camera view of a scene, which may include an object, such as a package utilized to deliver an item. The image may be analyzed for the presence of a tag 1910. As described above, the tag may be a high contrast set of geometric images and/or a logo that is utilized to identify objects.

If the tag is not found, then the method may end 1912 because the object may not be eligible for use with the AR application. In other words, no application is launched. If the tag is located, content for presentation on the client device is determined 1914. In various embodiments, the content is related to the user and/or the tag. For example, the content may be related to the user account, and in various embodiments, to the item obtained by the user. By way of example, if the user purchase an item and it is delivered in an object, such as a package, the content may be based on the item, or other interests associated with the user. In various embodiments, the tag may be associated with a promotional campaign or other event.

Rules for presentation of the content may be analyzed 1916. If rules exist, then they may be applied 1918. For example, rules may be related to how content is presented, age restriction on the content, access rights, and the like. In various embodiments, tags may be single use tags, such that once they are scanned additional content may not be obtained. However, in other embodiments, tags may be multi-use tags that enable repeated use. Additionally, data rules and the like may also be applicable. For example, if a user has selected to limit data transmission, content may be selected that has a reduced quantity of data transmission. The content is then provided to the client device 1920.

In various embodiments, the user may interact with the content. For example, the content may include an AR game where the user can provide an input to change various features. Moreover, in embodiments, the content may be a virtual character where the user can direct an action by the character. If an action occurs 1922, then the content may be updated 1924. For example, in response to movement of the client device, the rendered content on the client device may adjust, such as to show a different view of the object. Additionally, in various embodiments, updates may also be provided to the user account or user profile, such as for the collectable campaigns described above.

Figure 20:
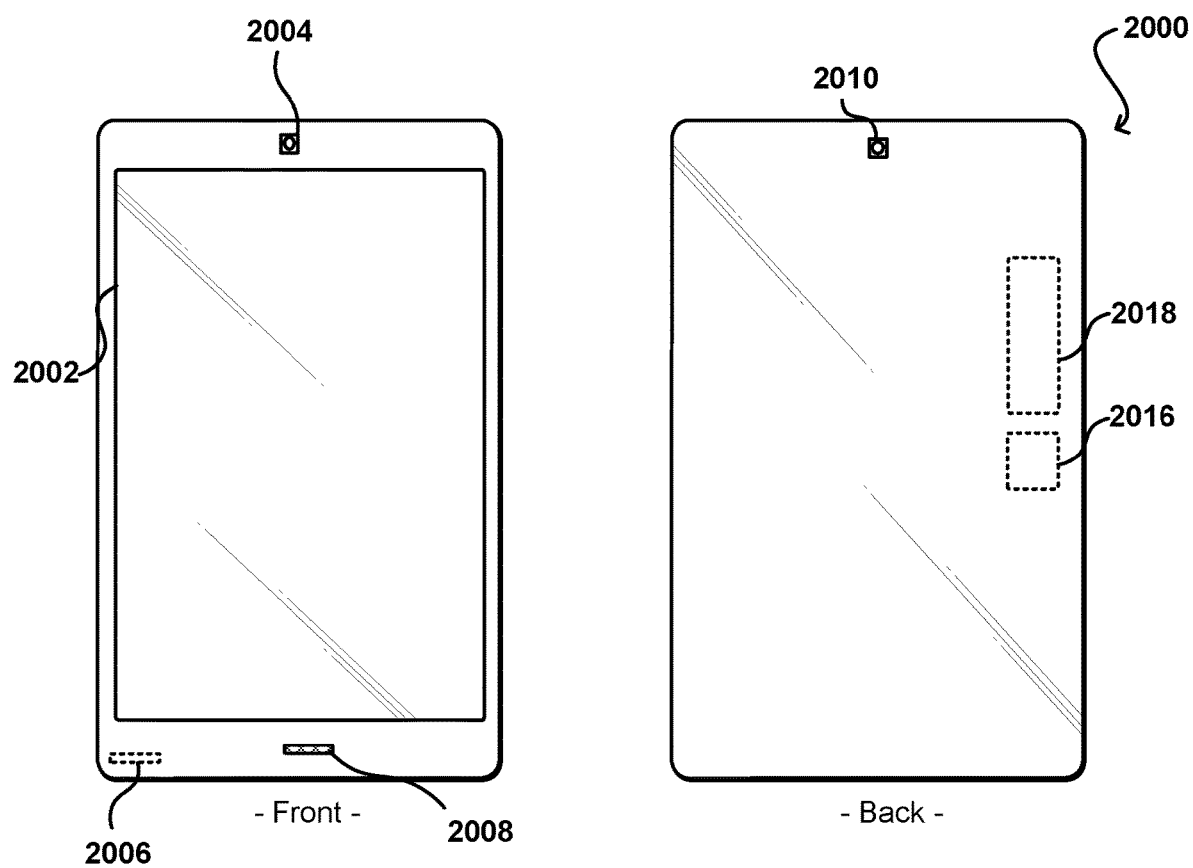
FIG. 20 illustrates an example computing device that can execute a gaming application in accordance with various embodiments.

FIG. 20 illustrates front and back views of an example electronic computing device 2000 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, notebook computers, electronic book readers, personal data assistants, cellular phones, video gaming consoles or controllers, television set top boxes, and portable media players, among others.

In this example, the computing device 2000 has a display screen 2002 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including an image capture element 2004 on the front of the device and at least one image capture element 2010 on the back of the device. It should be understood, however, that image capture elements could also, or alternatively, be placed on the sides or corners of the device, and that there can be any appropriate number of capture elements of similar or different types. Each image capture element 2004 and 2010 may be, for example, a camera, a charge-coupled device (CCD), a motion detection sensor or an infrared sensor, or other image capturing technology.

As discussed, the device can use the images (e.g., still or video) captured from the imaging elements 2004 and 2010 to generate a three-dimensional simulation of the surrounding environment (e.g., a virtual reality of the surrounding environment for display on the display screen of the device). Further, the device can utilize outputs from at least one of the image capture elements 2004 and 2010 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there is one microphone 2008 on the front side of the device. In some devices there may be only one microphone, while in other devices there might be at least one microphone on each side and/or corner of the device, or in other appropriate locations.

The device 2000 in this example also includes one or more orientation- or position-determining elements 2018 operable to provide information such as a position, direction, motion, or orientation of the device. These elements can include, for example, accelerometers, inertial sensors, electronic gyroscopes, and electronic compasses.

The example device also includes at least one communication mechanism 2006, such as may include at least one wired or wireless component operable to communicate with one or more electronic devices. The device also includes a power system 2016, such as may include a battery operable to be recharged through conventional plug-in approaches, or through other approaches such as capacitive charging through proximity with a power mat or other such device. Various other elements and/or combinations are possible as well within the scope of various embodiments.

Figure 21:
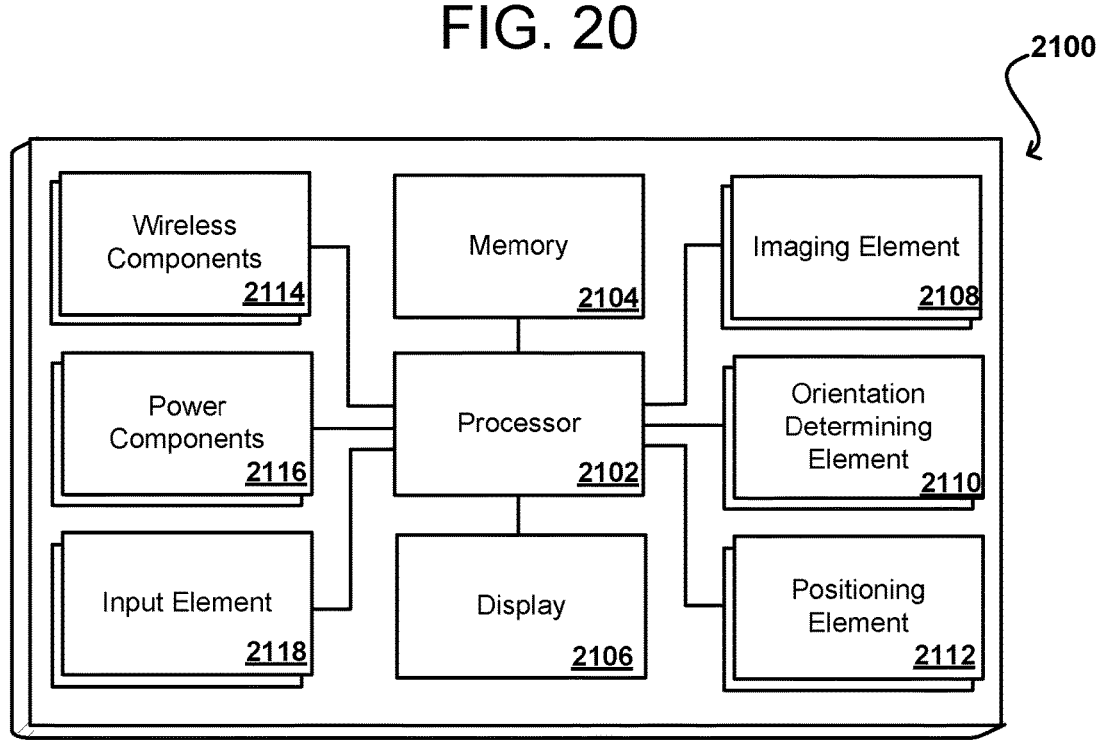
FIG. 21 illustrates example components of a computing device that can be used to implement aspects of the various embodiments.

FIG. 21 illustrates a set of basic components of an electronic computing device 2100 such as the device 2000 described with respect to FIG. 20. In this example, the device includes at least one processing unit 2102 for executing instructions that can be stored in a memory device or element 2104. As would be apparent to one of ordinary skill in the art, the device can include many types of memory, data storage, or computer-readable media, such as a first data storage for program instructions for execution by the processing unit(s) 2102, the same or separate storage can be used for images or data, a removable memory can be available for sharing information with other devices, and any number of communication approaches can be available for sharing with other devices.

The device typically will include some type of display screen 2106, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 2108, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 2100 also includes at least one orientation determining element 2110 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 2100. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 2112 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 2114 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 2116, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 2118 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for providing content, comprising:
receiving an image, from a user, the image including at least a portion of a representation of a tag;
determining a user account, associated with the user, the user account including user information for the user;
determining an object associated with the tag, the tag being arranged on the object;
determining an object size corresponding to physical dimensions of the object;
mapping at least a portion of the object, the mapping corresponding to an initialization point defining a location of at least a portion of the object relative to a user device;
determining content related to the tag, based at least in part on the user information, the content being selected from a group of content elements associated with one or more promotions;
selecting, from the group of content elements, selected content for display on the user device, the selected content being determined based, at least in part, on a user profile associated with the one or more promotions, the selected content being a previously unselected content element from the group of content elements; and
providing the selected content to the user device, the selected content being rendered in an augmented reality (AR) environment, wherein at least a portion of the object is utilized in a presentation of the selected content, and a content size is determined based, at least in part, on the object size and an available display area of the user device such that the selected content is scaled to fit within a visible display area of the user device.

2. The method of claim 1, wherein the user information includes at least one of a user geographic location, a user purchase history, or a user membership status.

3. The method of claim 1, further comprising:
receiving an input, from the user, related to the selected content, the input including an interaction with the selected content transmitted via the user device; and
updating the selected content, based on the input.

4. The method of claim 1, further comprising:
providing second content to the user device, the second content corresponding to at least one of a recommendation, a promotion, or a sharing option.

5. A method for providing content, comprising:
receiving a representation of a tag, the tag corresponding to an indication to provide augmented reality (AR) content;
determining AR content, based at least in part on the tag and a user profile associated with tag content, the AR content selected from a group of AR content elements, the AR content being a previously unselected content element from the group of AR content elements;
determining a presentation mode for the AR content, based at least in part on the AR content and an object associated with the tag;
determining AR content dimensions, based at least in part on object dimensions of the object associated with the tag; and
providing the AR content, to a client device, for display within an AR application, the AR content dimensions being scaled based, at least in part, on an object size and an available display area of the client device to fit within a visible display area of the client device.

6. The method of claim 5, further comprising:
receiving an image, the image including at least at portion of the object;
determining the tag is associated with the object; and
determining at least one dimension, for the AR content, based at least in part on metadata associated with the tag.

7. The method of claim 5, further comprising:
determining a mapping for the object, the mapping identifying a location of the object relative to the client device; and
determining an initialization point for the AR content, wherein the AR content replaces the object when viewed through the AR application.

8. The method of claim 7, wherein a texture of the object matches a texture of the AR content.

9. The method of claim 5, further comprising:
determining an initialization point for the AR content, based at least in part on a location of the object; and
determining a rendering location, for the AR content, relative to the initialization point, the AR content interacting with the object.

10. The method of claim 5, further comprising:
determining a recommendation, based at least in part on the AR content and a user interaction with the AR content, the recommendation corresponding to a product for purchase or a link related to the AR content; and
providing the recommendation, to the client device, for display within the AR application with the AR content.

11. The method of claim 5, further comprising:
receiving an image, including at least a portion of the object and the user;
determining a marker associated with the portion of the object, the marker corresponding to at least one feature of the user; and
determining a boundary of the AR content, based at least in part on the marker.

12. The method of claim 5, further comprising:
providing, to the user, an option to integrate a social media platform; and
generating social media content, for the user, the social media content including the AR content and at least metadata for tracking a performance factor of the social media content.

13. The method of claim 5, further comprising:
determining an outline of the object;
determining the outline corresponds to specific AR content; and
providing the specific AR content to the client device.

14. The method of claim 13, wherein the outline of the object corresponds to a portion of the object, the portion being removed from the object.

15. The method of claim 5, further comprising:
determining a rule associated with the tag, the tag defining access permission for AR content associated with the tag;
receiving a second representation of the tag;
determining a number of access attempts meets a threshold; and
denying access to the AR content.

16. A system, comprising:
at least one processor; and
memory including instructions that, when executed by the at least one processor, cause the system to:
receive a representation of a tag, the tag corresponding to an indication to provide augmented reality (AR) content;
determine AR content, based at least in part on the tag and a user profile associated with tag content, the AR content selected from a group of AR content elements, the AR content being a previously unselected content element from the group of AR content elements;
determine a presentation mode for the AR content, based at least in part on the AR content and an object associated with the tag;
determining AR content dimensions, based at least in part on object dimensions of the object associated with the tag; and
provide the AR content, to a client device, for display within an AR application, the AR content dimensions being scaled based, at least in part, on an object size and an available display area of the client device to fit within a visible display area of the client device.

17. The system of claim 16, wherein the instructions when executed further cause the system to:
receive an image, the image including at least at portion of the object;
determine the tag is associated with the object; and
determine at least one dimension, for the AR content, based at least in part on metadata associated with the tag.

18. The system of claim 16, wherein the instructions when executed further cause the system to:
provide, to the user, an option to integrate a social media platform; and
generate social media content, for the user, the social media content including the AR content and at least metadata for tracking a performance factor of the social media content.

19. The system of claim 16, wherein the instructions when executed further cause the system to:
determine a recommendation, based at least in part on the AR content and a user interaction with the AR content, the recommendation corresponding to a product for purchase related to the AR content; and
provide the recommendation, to the client device, for display within the AR application with the AR content.

20. The system of claim 16, wherein the instructions when executed further cause the system to:
determine a rule associated with the tag, the tag defining access permission for AR content associated with the tag;
receive a second representation of the tag;
determine a number of access attempts meets a threshold; and
deny access to the AR content.

* * * * *